United States Patent
Li et al.

(10) Patent No.: US 12,538,250 B2
(45) Date of Patent: Jan. 27, 2026

(54) METHOD, APPARATUS, AND SYSTEM FOR ACCESSING LTE NETWORK BY MOBILE TERMINAL

(71) Applicant: Huawei Technologies Co., Ltd., Shenzhen (CN)

(72) Inventors: Wenjiao Li, Shenzhen (CN); Wenlong Zhao, Shenzhen (CN); Xin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 477 days.

(21) Appl. No.: 18/007,273

(22) PCT Filed: Jul. 27, 2021

(86) PCT No.: PCT/CN2021/108695
§ 371 (c)(1),
(2) Date: Jan. 27, 2023

(87) PCT Pub. No.: WO2022/022518
PCT Pub. Date: Feb. 3, 2022

(65) Prior Publication Data
US 2023/0276393 A1    Aug. 31, 2023

(30) Foreign Application Priority Data
Jul. 30, 2020    (CN) .......................... 202010753652.8

(51) Int. Cl.
*H04W 60/04*    (2009.01)
*H04W 48/16*    (2009.01)

(52) U.S. Cl.
CPC ........... *H04W 60/04* (2013.01); *H04W 48/16* (2013.01)

(58) Field of Classification Search
CPC ... H04W 48/18; H04W 48/10; H04W 60/005; H04W 8/24; H04W 72/30; H04W 12/037; H04W 84/20; H04W 76/15
(Continued)

(56) References Cited

U.S. PATENT DOCUMENTS 8,699,711 B2 * 4/2014 Mukherjee .......... H04W 12/037
                                                         380/270
9,100,931 B2 * 8/2015 Guo ....................... H04W 72/30
(Continued)

FOREIGN PATENT DOCUMENTS

AU    2023328885 A1 *  4/2025  ............ H04W 48/02
CN    102761937 A     10/2012
(Continued)

OTHER PUBLICATIONS

C. S. Bontu and E. Illidge, "DRX mechanism for power saving in LTE," in IEEE Communications Magazine, vol. 47, No. 6, pp. 48-55, Jun. 2009, doi: 10.1109/MCOM.2009.5116800 (Year: 2009).*
(Continued)

*Primary Examiner* — William D Cumming
(74) *Attorney, Agent, or Firm* — Slater Matsil, LLP

(57) ABSTRACT

In a method, when a quantity of attach failures or TAU failures reaches a threshold, a mobile terminal starts a T3402 timer and disables an E-UTRA capability, and attempts to access the LTE network again after the T3402 timer expires. Duration of the T3402 timer is determined by a moving speed of the mobile terminal. When the moving speed reaches a first value, a value of the T3402 timer is less than a default duration. After the T3402 timer expires, the mobile terminal searches for the LTE network again, and sends an attach request to a network device of the LTE network.

20 Claims, 10 Drawing Sheets

(58) Field of Classification Search
USPC .................................................. 370/329, 312
See application file for complete search history.

(56) References Cited

U.S. PATENT DOCUMENTS

| | | | |
|---|---|---|---|
| 9,854,480 B2* | 12/2017 | Shu | ..................... H04W 60/005 |
| 10,327,137 B2* | 6/2019 | Molina | ............... H04L 63/1458 |
| 2013/0308515 A1* | 11/2013 | Guo | ...................... H04W 72/30 |
| | | | 370/312 |
| 2016/0277926 A1* | 9/2016 | Molina | ................. H04W 12/06 |
| 2016/0309374 A1* | 10/2016 | Shu | ....................... H04W 48/18 |
| 2020/0403866 A1* | 12/2020 | Hayes | .................. H04W 76/15 |
| 2020/0403877 A1* | 12/2020 | Hayes | .................... H04L 67/12 |
| 2020/0404513 A1* | 12/2020 | Hayes | .................. H04W 84/20 |
| 2023/0276393 A1* | 8/2023 | Li | ........................... H04W 8/24 |
| | | | 370/329 |

FOREIGN PATENT DOCUMENTS

| | | | | | |
|---|---|---|---|---|---|
| CN | 107846722 A | | 3/2018 | | |
| CN | 104904265 B | * | 4/2019 | ............ | H04W 60/00 |
| CN | 114071643 A | * | 2/2022 | ............ | H04W 48/16 |
| GB | 2621834 A | * | 2/2024 | .............. | H04W 8/18 |
| WO | WO-2020257735 A1 | * | 12/2020 | .......... | H04W 40/242 |
| WO | WO-2020257737 A1 | * | 12/2020 | .......... | H04W 40/242 |
| WO | WO-2020257738 A1 | * | 12/2020 | .......... | H04W 40/242 |
| WO | WO-2022022518 A1 | * | 2/2022 | ............ | H04W 48/16 |
| WO | WO-2022127334 A1 | * | 6/2022 | ............ | H04W 48/16 |
| WO | WO-2024042026 A1 | * | 2/2024 | .............. | H04W 8/18 |

OTHER PUBLICATIONS

3GPP TS 24.301 V16.5.1 (Jul. 2020), 3rd Generation Partnership Project; Technical Specification Group Core Network and Terminals; Non-Access-Stratum (NAS) protocol for Evolved Packet System (EPS); Stage 3 (Release 16), total 584 pages.

* cited by examiner

METHOD, APPARATUS, AND SYSTEM FOR ACCESSING LTE NETWORK BY MOBILE TERMINAL

CROSS-REFERENCE TO RELATED APPLICATIONS

This application is a national stage of International Application No.PCT/CN2021/108695, filed on Jul. 27, 2021, which claims priority to Chinese Patent Application No. 202010753652.8, filed on Jul. 30, 2020. Both of the aforementioned applications are hereby incorporated by reference in their entireties.

TECHNICAL FIELD

Embodiments of this application relate to the field of communication technologies, and in particular, to a method, an apparatus, and a system for accessing an LTE network by a mobile terminal.

BACKGROUND

In a mobile communications system, a mobile terminal may access a network through attaching (attach) or tracking area update (tracking area update, TAU). Specifically, after being powered on, the mobile terminal needs to be attached to the network, so as to obtain a resource allocated by the network to perform a mobile service. In a moving process, the mobile terminal may update a location area through TAU, thereby maintaining a network connection.

In some scenarios, for example, when network congestion occurs or interference is relatively strong, the mobile terminal may continuously fail to access the network. According to a definition in TS24.301 formulated by the 3rd generation partnership project (3rd generation partnership project, 3GPP), when the mobile terminal continuously fails to access a long term evolution (long term evolution, LTE) network, a T3402 timer is started and an evolved universal terrestrial radio access network (evolved universal terrestrial radio access network, E-UTRA) capability is disabled (disable the E-UTRA capability). Default duration of the T3402 timer is 12 minutes. The mobile terminal can attempt to access the LTE network again only after the T3402 timer expires.

SUMMARY

Embodiments of this application provide a method, an apparatus, and a system for accessing an LTE network by a mobile terminal, so that in a moving process of the mobile terminal, efficiency of accessing the LTE network by the mobile terminal can be improved, and good use experience of the mobile terminal can be provided for a user.

According to a first aspect, an embodiment of this application provides a method for accessing an LTE network by a mobile terminal, and the method is applied to the mobile terminal. The method may include: A quantity of attach failures or TAU failures of the mobile terminal reaches a threshold; the mobile terminal starts a T3402 timer and disables an E-UTRA capability in response to that the quantity of attach failures or TAU failures of the mobile terminal reaches the threshold, where duration of the T3402 timer is determined by a moving speed of the mobile terminal, and when the moving speed reaches a first value, the duration of the T3402 timer is less than first default duration; and after the T3402 timer expires, the mobile terminal searches for the LTE network again, and sends an attach request to a first network device.

According to the method provided in the first aspect, after starting the T3402 timer and disabling the E-UTRA capability (disable the E-UTRA capability), the mobile terminal may enter a coverage area in which the LTE network is in a good condition if the mobile terminal moves at a relatively high speed. The mobile terminal can re-access the LTE network after the T3402 timer determined by the mobile terminal expires, without waiting for default duration, that is, 12 minutes. Therefore, after entering a coverage area with a good network condition, the mobile terminal can quickly access the LTE network. In this way, in a moving process of the mobile terminal, efficiency of accessing the LTE network by the mobile terminal can be improved, and good use experience of the mobile terminal can be provided for a user.

With reference to the first aspect, in some embodiments, the first default duration may be default duration of T3402, that is, 12 minutes; or may be another preset value. This is not limited in this embodiment of this application.

With reference to the first aspect, in some embodiments, the threshold may be 5, or may be another preset value. This is not limited in this embodiment of this application.

With reference to the first aspect, in some embodiments, that a quantity of attach failures of the mobile terminal reaches the threshold may mean that the mobile terminal successively sends an attach request to a second network device for n times, where each time after the attach request is sent, no response message sent by the second network device is received, or an attach reject message sent by the second network device is received; and n is equal to the threshold.

With reference to the first aspect, in some embodiments, that a quantity of TAU failures of the mobile terminal reaches the threshold may mean that the mobile terminal successively sends a TAU request to the second network device for n times, where each time after the TAU request is sent, no response message sent by the second network device is received, or a TAU reject message sent by the second network device is received; and n is equal to the threshold.

With reference to the first aspect, the threshold quantity of attach failures of the mobile terminal may be for a same cell, or may be for different cells.

With reference to the first aspect, when a threshold quantity of attach failures occur on the mobile terminal, the mobile terminal may be in a static state or may be in a moving state.

With reference to the first aspect, in some embodiments, the mobile terminal may determine the duration of the T3402 timer in the following manners:

(1) When the moving speed of the mobile terminal reaches the first value, the duration of the T3402 timer determined by the mobile terminal is less than the default duration of the T3402 timer. Herein, the first value may be preset, for example, may be 200 km/h. This is not limited in this embodiment of this application.

In some embodiments, when the moving speed of the mobile terminal is equal to the first value, the duration of the T3402 timer is equal to first duration. When the moving speed of a mobile terminal 10 is equal to a second value, the duration of the T3402 timer is equal to second duration. The second value is greater than the first value, the second duration is less than the first duration, and both the first duration and the second duration are less than the default duration of the T3402 timer. In other words, a higher moving speed indicates shorter duration of the T3402 timer determined by the mobile terminal.

In an implementation, the duration of the T3402 timer determined by the mobile terminal varies with the moving speed.

In another implementation, the duration of the T3402 timer determined by the mobile terminal varies with an interval in which the moving speed is located. When the moving speed of the mobile terminal reaches the first value, the duration of the T3402 timer determined by the mobile terminal is duration corresponding to an interval in which a current moving speed of the mobile terminal is located.

In some other embodiments, when the moving speed of the mobile terminal reaches the first value, regardless of a specific value of the moving speed, a value of the duration of the T3402 timer is fixed second default duration. The second default duration is less than the first default duration.

(2) When the moving speed of the mobile terminal is less than the first value, the duration of the T3402 timer determined by the mobile terminal may be kept the default duration.

With reference to the first aspect, in some embodiments, before starting the T3402 timer and disabling the E-UTRA capability, the mobile terminal may further detect the moving speed. Herein, the mobile terminal may periodically detect the moving speed thereof after being powered on, or may start to detect the moving speed thereof when it is detected that the quantity of attach failures or TAU failures reaches the threshold. This is not limited in this embodiment of this application.

With reference to the first aspect, in some embodiments, the mobile terminal detects the moving speed thereof in the following manners:

(1) The mobile terminal may be configured to obtain real-time location information of the mobile terminal by using a GNSS, such as a GPS, a BDS, a GLONASS, a QZSS, or an SBAS; and subsequently, based on the real-time location information of the mobile terminal at any two time points, determine a moving distance of the mobile terminal between the two time points and calculate the moving speed.

(2) The mobile terminal may also calculate the moving speed by using a signal detected by the GNSS and through an original Doppler observation value or a Doppler observation value obtained by real time kinematic.

(3) The mobile terminal may measure an acceleration value, and integrate measured acceleration to obtain the moving speed.

(4) When located on a public vehicle (such as a high-speed railway, a motor vehicle, or an aircraft), the mobile terminal may use a short-range communications technology such as BT, Wi-Fi, NFC, or the light fidelity technology (light fidelity, LiFi) to establish a short-range communication connection to the public vehicle, and then obtain, based on the short-range communication connection, speed information shared by the public vehicle.

With reference to the first aspect, in some embodiments, that the mobile terminal disables the E-UTRA capability (disable the E-UTRA capability) means that the mobile terminal no longer works on a 4G frequency band, and does not search for any signal on the 4G frequency band. Disabling the E-UTRA capability by the mobile terminal may also be considered as disabling the LTE network by the mobile terminal.

With reference to the first aspect, in some embodiments, in a case of moving quickly, the mobile terminal may have already entered the coverage area in which the LTE network is in a good condition when the mobile terminal recovers the E-UTRA capability and sends the attach request to the first network device. In this way, after sending the attach request to the first network device, the mobile terminal may receive an attach accept message (attach accept) sent by a network device 200. In other words, the mobile terminal may successfully access the LTE network.

With reference to the first aspect, in some embodiments, the mobile terminal may further display a first user interface, and the first user interface includes a first area. Before the mobile terminal receives the attach accept message sent by the first network device, the first area displays no content, or the first area displays an identifier of a network currently accessed by the mobile terminal; and after the mobile terminal receives the attach accept message sent by the first network device, the first area displays an identifier of the LTE network. In this way, the user may be prompted about a current connection status between the mobile terminal and the network by using the content displayed in the first area.

According to a second aspect, an embodiment of this application provides a mobile terminal, including one or more processors and one or more memories. The one or more memories are coupled to the one or more processors, the one or more memories are configured to store computer program code, and the computer program code includes computer instructions. When the computer instructions are executed by the one or more processors, the terminal is enabled to perform the method in the first aspect or in any possible implementation of the first aspect.

According to a third aspect, an embodiment of this application provides a computer storage medium, including computer instructions. When the computer instructions are run on a terminal, a communications apparatus is enabled to perform the method in the first aspect or in any possible implementation of the first aspect.

According to a fourth aspect, an embodiment of this application provides a computer program product. When the computer program product runs on a computer, the computer is enabled to perform the method in the first aspect or in any possible implementation of the first aspect.

According to a fifth aspect, an embodiment of this application provides a mobile communications system. The mobile communications system includes a mobile terminal, a first network device, and a second network device, where the mobile terminal is the mobile terminal according to the second aspect.

According to the technical solutions provided in embodiments of this application, when the quantity of attach failures or TAU failures reaches the threshold, the mobile terminal starts the T3402 timer and disables the E-UTRA capability, and attempts to access the LTE network again after the T3402 timer expires. The duration of the T3402 timer is determined by the moving speed of the mobile terminal. When the moving speed reaches the first value, a value of the T3402 timer is less than the default duration. If the mobile terminal moves at a relatively high speed, the mobile terminal may enter the coverage area in which the LTE network is in a good condition. In this case, the mobile terminal can quickly access the LTE network. In this way, in the moving process of the mobile terminal, the efficiency of accessing the LTE network by the mobile terminal can be improved, and good use experience of the mobile terminal can be provided for the user.

DETAILED DESCRIPTION OF ILLUSTRATIVE EMBODIMENTS

Figure 1:
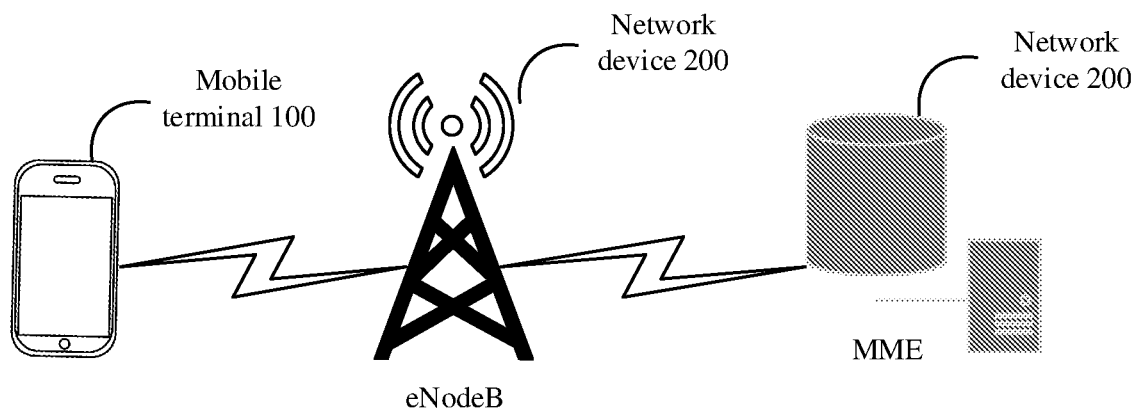
FIG. 1 is a schematic diagram of a structure of a communications system according to an embodiment of this application.

The technical solutions according to embodiments of this application are clearly and completely described below with reference to the accompanying drawings. In the descriptions of embodiments of this application, unless otherwise stated, "/" means "or". For example, A/B may represent A or B. In this specification, "and/or" refers to only an association relationship that describes associated objects, indicating presence of three relationships. For example, A and/or B may represent the following three cases: Only A exists, both A and B exist, and only B exists. In addition, in the descriptions of embodiments of this application, "a plurality of" means two or more than two.

Terms "first" and "second" mentioned below are merely intended for a purpose of description, and shall not be understood as an indication or implication of relative importance or implicit indication of the number of indicated technical features. Therefore, a feature limited by "first" and "second" may explicitly or implicitly include one or more features. In the descriptions of embodiments of this application, unless otherwise stated, "a plurality of" means two or more than two.

The term "user interface (user interface, UI)" in the following embodiments of this application is a medium interface for interaction and information exchange between an application or an operating system and a user. The user interface implements conversion between an internal form of information and a form acceptable to the user. The user interface is source code written by using a specific computer language such as Java or an extensible markup language (extensible markup language, XML). The source code of the user interface is parsed and rendered on an electronic device, and is finally presented as content that can be recognized by the user. A common representation form of the user interface is a graphical user interface (graphic user interface, GUI), which is a user interface that is displayed in a graphical manner and that is related to a computer operation. The user interface may be a visual interface element displayed on a display of the electronic device, such as a text, an icon, a button, a menu, a tab, a text box, a dialog box, a status bar, a navigation bar, or a widget.

According to the definition in TS24.301 formulated by the 3GPP, when continuously failing to access an LTE network, a mobile terminal starts a T3402 timer and disables an E-UTRA capability (disable the E-UTRA capability). Default duration of the T3402 timer is 12 minutes. The mobile terminal can attempt to access the LTE network again only after the T3402 timer expires. In other words, within 12 minutes, even if the mobile terminal has moved to a coverage area with a good network condition, the mobile terminal still cannot access the LTE network. This mechanism causes low efficiency of accessing the LTE network by the mobile terminal.

Based on a current problem that efficiency of accessing an LTE network by a mobile terminal is relatively low, embodiments of this application provide a method, an apparatus, and a system for accessing an LTE network by a mobile terminal. In this method, the mobile terminal may determine a value of the T3402 timer based on a moving speed of the mobile terminal, instead of using the default duration. When the moving speed reaches a first value, the value of the T3402 timer determined by the mobile terminal is less than the default duration. In other words, the value of the T3402 timer is decreased.

In embodiments of this application, the default duration of the T3402 timer may be referred to as first default duration. The first default duration may be 12 minutes that are defined in TS24.301, or may be another value. This is not limited in embodiments of this application.

After starting the T3402 timer and disabling the E-UTRA capability (disable the E-UTRA capability), the mobile terminal may enter a coverage area in which the LTE network is in a good condition if the mobile terminal moves at a relatively high speed. In the method provided in embodiments of this application, the mobile terminal can re-access the LTE network after the T3402 timer determined by the mobile terminal expires, without waiting for the default duration. Therefore, after entering a coverage area with a good network condition, the mobile terminal can quickly access the LTE network, thereby improving efficiency of accessing the LTE network and providing a user with good use experience of the mobile terminal.

In the following embodiments of this application, scenarios in which the mobile terminal continuously fails to access the LTE network may specifically include: Scenario 1: The mobile terminal fails to attach (attach) and a quantity of attach (attach) attempts reaches a preset value. Scenario 2: The mobile terminal fails to perform TAU, and a quantity of TAU attempts reaches a preset value. The two scenarios are described in detail in the following method embodiments, and details are not described herein.

In the following embodiments of this application, that the mobile terminal disables the E-UTRA capability (disable the E-UTRA capability) means that the mobile terminal no longer works on a 4G frequency band, and does not search for any signal on the 4G frequency band. Disabling the E-UTRA capability by the mobile terminal may also be considered as disabling the LTE network by the mobile terminal.

To better describe the method for accessing an LTE network by a mobile terminal provided in embodiments of this application, a mobile communications system provided in embodiments of this application is first described below.

FIG. 1 shows an architecture of a mobile communications system 10 according to an embodiment of this application.

As shown in FIG. 1, the mobile communications system 10 is an LTE system. The mobile communications system 10 may include a mobile terminal 100 and a 4G system (an evolved packet system, EPS).

The mobile terminal 100 may include a smartphone (for example, a mobile phone running an Android system or an iOS system), a wearable device (for example, a smartwatch or a smart band), a tablet computer, a notebook computer, a palmtop computer, a mobile internet device (MID, mobile internet device), or another mobile portable device. The mobile terminal 100 may also be referred to as user equipment (user equipment, UE).

The mobile terminal 100 provides a 4G wireless communication solution. In some embodiments, the mobile terminal 100 may also provide a solution including 2G/3G/5G wireless communication. To be specific, the mobile terminal 100 supports 4G (that is, LTE), and may further support 2G, 3G, 5G, or even a future mobile communication solution.

The mobile terminal 100 stores user information. The user information may include an IMSI, and may be stored in a subscriber identity module (subscriber identity module, SIM) card of the mobile terminal 100. The mobile terminal 100 may connect to a network device 200 by using the user information as an identity, so as to access an LTE network; and perform a mobile service by using a resource allocated by the LTE network, for example, initiate a call, obtain a video resource, or obtain an audio resource by using a voice over long term evolution solution (voice on long term evolution, VOLTE) that is based on an internet protocol multimedia subsystem (internet protocol multimedia subsystem, IMS).

The mobile terminal 100 may access the LTE network through attaching (attach) or TAU. For detailed processes of attach (attach) and TAU, refer to related descriptions in the following method embodiments.

In this embodiment of this application, when continuously failing to access the LTE network, the mobile terminal 100 may start a T3402 timer and disable an E-UTRA capability. After the T3402 timer expires, the mobile terminal 100 attempts to access the LTE network again. The value of the T3402 timer is determined by the mobile terminal 100 based on a moving speed of the mobile terminal 100. When the moving speed reaches a first value, the value of the T3402 timer determined by the mobile terminal is less than default duration, that is, 12 minutes. In this way, it can be ensured that the mobile terminal 100 quickly accesses the LTE network after entering a coverage area in which the LTE network is in a good condition, thereby improving efficiency of accessing the LTE network and providing a user with good use experience of the mobile terminal.

The EPS may include one or more network devices 200. The network device 200 is configured to allocate a network resource to the mobile terminal 100 after the mobile terminal 100 accesses the LTE network, so as to support a mobile service of the mobile terminal 100. The network device 200 may include, for example, a 4G base station, a 4G core network (evolved packet core, EPC) device, and the like. The 4G base station is connected to an EPC device. There may be one or more 4G base stations and EPC devices.

The 4G base station may be an evolved NodeB (evolved NodeB, eNodeB), an access point (access point, AP), a transit node (transmit/receive point, TRP), a central unit (central unit, CU), or another network entity.

The EPC device may include the following network elements: a mobility management entity (mobility management entity, MME), a serving gateway (serving gateway, SGW), a packet data network gateway (packet data network gateway, PGW), a home subscriber server (home subscriber server, HSS), an application server, and the like. The MME is mainly configured to provide access control, mobility management, attach and detach, and session management (for example, bearer establishment, modification, and release) for the mobile terminal 100.

A signal coverage area of the 4G base station may be divided into a plurality of tracking areas (tracking area, TA), or signal coverage areas of a plurality of 4G base stations form one TA. The mobile terminal 100 needs to register with one or more TAs, so that the EPC device performs paging management. Specifically, the EPC device may page the terminal in the TA with which the mobile terminal 100 is registered, without searching in the entire network. If the terminal in an idle state moves out of the TA with which the terminal is currently registered, a TAU procedure is initiated to notify the EPC device of a new TA in which the terminal is currently located.

Figure 2A:
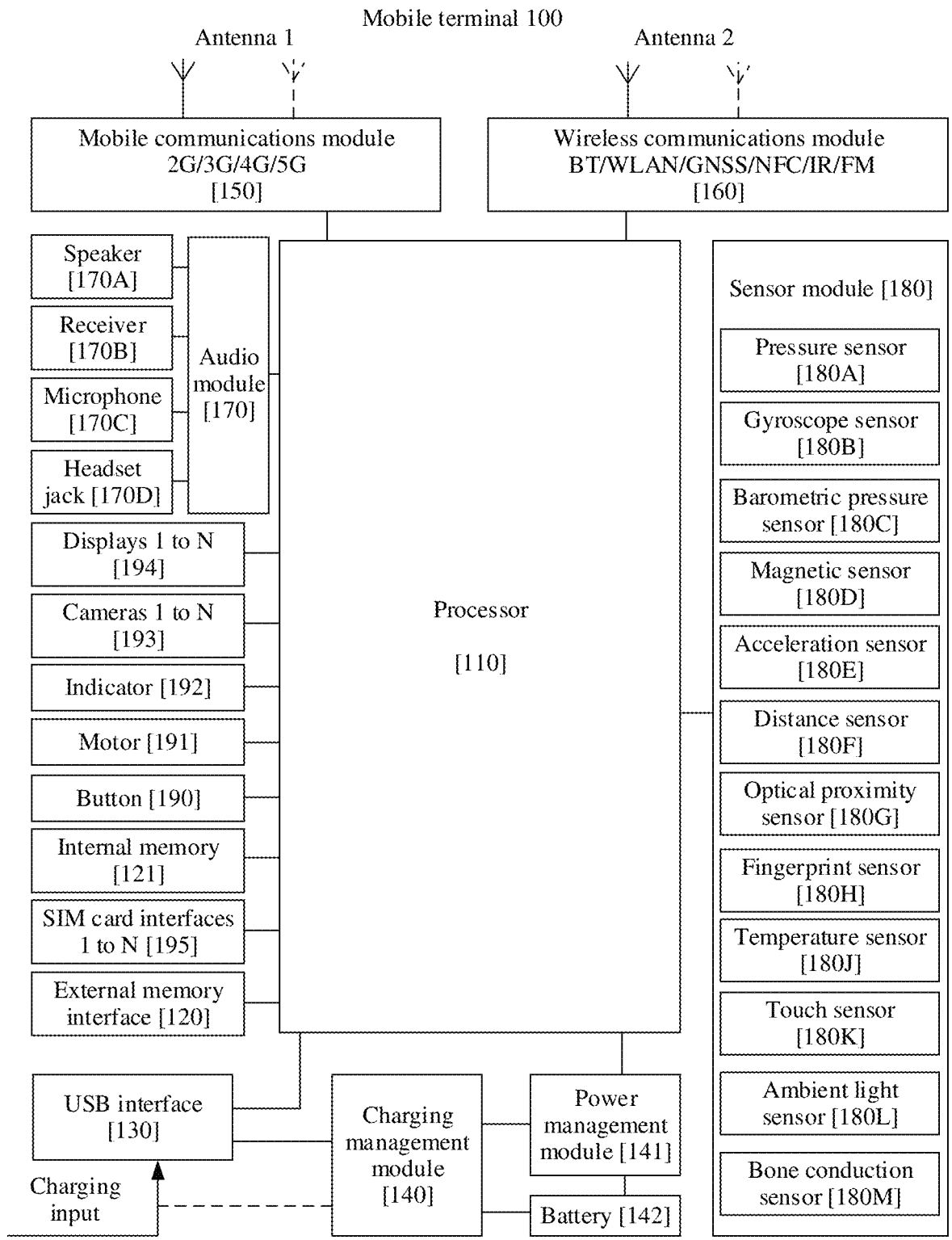
FIG. 2A is a schematic diagram of a hardware structure of a mobile terminal according to an embodiment of this application.

FIG. 2A shows an example schematic diagram of a structure of a mobile terminal 100 according to an embodiment of this application.

The mobile terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the mobile terminal 100. In some other embodiments of this application, the mobile terminal 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the mobile terminal 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces a waiting time of the processor 110, and improves system efficiency.

A wireless communication function of the mobile terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile terminal 100 may be configured to cover one or more communication bands. For example, the antenna 1 may cover a 4G communication band, and the antenna 2 may cover a 2G/3G/5G communication band. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 provides a 4G wireless communication solution that is applied to the mobile terminal 100. In some embodiments, the mobile communications module 150 may also provide a 2G/3G/5G wireless communication solution that is applied to the mobile terminal 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Subsequently, the demodulator transmits the low-frequency baseband signal obtained through demodulation to the baseband processor for processing. The low-frequency baseband signal is processed by the baseband processor, and then is transmitted to the application processor. The application processor outputs a sound signal by using an audio device (which is not limited to the speaker 170A, the receiver 170B, and the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the mobile terminal 100, to wireless communication including a wireless local area network (wireless local area network, WLAN) (for example, a wireless fidelity (wireless fidelity, Wi-Fi) network), a short range communication network such as Bluetooth™ (Bluetooth™, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave through the antenna 2, performs demodulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the mobile terminal 100 is coupled to the mobile communications module 150, and the antenna 2 is coupled to the wireless communications module 160, so that the mobile terminal 100 may communicate with a network and another device by using a wireless communications technology. The wireless communications technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), a Galileo satellite navigation system (Galileo satellite navigation system), and/or a satellite based augmentation system (satellite based augmentation system, SBAS).

The mobile terminal 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile terminal 100 may include one or N displays 194, where N is a positive integer greater than 1.

The internal memory 121 may be configured to store computer-executable program code. The executable program code includes instructions. The processor 110 executes various function applications and data processing of the mobile terminal 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (for example, audio data or a phone book) created in a process of using the mobile terminal 100. In addition, the internal memory 121 may include a high-speed random access memory, or may include a nonvolatile memory, for example, at least one magnetic disk storage device, a flash memory, or a universal flash storage (universal flash storage, UFS).

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile terminal 100 determines pressure intensity based on the change of the capacitance. When a touch operation is performed on the display 194, the mobile terminal 100 detects intensity of the touch operation by using the pressure sensor 180A. The mobile terminal 100 may also calculate a touch location based on a detection signal of the pressure sensor 180A. In some embodiments, touch operations that are performed at a same touch location but with different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyroscope sensor 180B may be configured to determine a motion posture of the mobile terminal 100. In some embodiments, angular velocities of the mobile terminal 100 around three axes (that is, an x-axis, a y-axis, and a z-axis) may be determined by using the gyroscope sensor 180B.

The acceleration sensor 180E may detect magnitudes of accelerations of the mobile terminal 100 in various directions (generally on three axes). A magnitude and a direction of gravity may be detected when the mobile terminal 100 is stationary. The acceleration sensor 180E may be further configured to identify a posture of the mobile terminal, and be applied to applications such as switching between a landscape screen and a portrait screen, and a pedometer.

The distance sensor 180F is configured to measure a distance. The mobile terminal 100 may measure the distance through infrared or laser.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a touch event type. A visual output related to the touch operation may be provided through the display 194. In some other embodiments, the touch sensor 180K may be alternatively disposed on a surface of the mobile terminal 100 at a position different from that of the display 194.

The SIM card interface 195 is configured to connect to a SIM card. The SIM card may be inserted into or removed from the SIM card interface 195, to be in contact with or separated from the mobile terminal 100. The mobile terminal 100 may support one or N SIM card interfaces, and N is a positive integer greater than 1. The SIM card interface 195 may support a nano-SIM card, a micro-SIM card, a SIM card, and the like. A plurality of cards may be simultaneously inserted into a same SIM card interface 195.

In some embodiments of this application, the wireless communications module 160 may be configured to obtain real-time location information of the mobile terminal 100 by using a GNSS, such as a GPS, a BDS, a GLONASS, a QZSS, or an SBAS. Based on the real-time location information of the mobile terminal 100 at any two time points, the processor 110 may determine a moving distance of the mobile terminal 100 between the two time points and calculate a moving speed.

In some embodiments of this application, the processor 110 may further calculate, by using the wireless communications module 160, the moving speed by using a signal detected by the GNSS and through an original Doppler observation value or a Doppler observation value obtained by real time kinematic.

In some embodiments of this application, the processor 110 may integrate measured acceleration by using a measured value of the acceleration sensor 180E to obtain the moving speed.

In some embodiments of this application, when the mobile terminal 100 is located on a public vehicle (such as a high-speed railway, a motor vehicle, or an aircraft), the wireless communications module 160 may use a short-range communications technology such as BT, Wi-Fi, NFC, or the light fidelity technology (light fidelity, LiFi) to establish a short-range communication connection to the public vehicle, and then obtain, based on the short-range communication connection, speed information shared by the public vehicle. The processor 110 may be configured to parse a signal that is received by the wireless communications module 160 based on the short-range communication connection, to determine the moving speed of the mobile terminal 100.

In this embodiment of this application, the processor 201 may be configured to: when the mobile terminal 100 continuously fails to access the LTE network, determine a value of the T3402 timer based on the moving speed of the mobile terminal 100, and start the T3402 timer. When the moving speed reaches a first value, the value of the T3402 timer that is determined by the processor 201 is less than default duration, that is, 12 minutes. In other words, the value of the T3402 timer is decreased.

In this embodiment of this application, the mobile communications module 150 may be configured to disable an E-UTRA capability after the T3402 timer is started. The mobile communications module 150 is further configured to recover the E-UTRA capability and attempt to access the LTE network again after the T3402 timer expires.

A software system of the mobile terminal 100 may use a layered architecture, an event-driven architecture, a microkernel architecture, a microservice architecture, or a cloud architecture. In this embodiment of this application, an Android system with a layered architecture is used as an example to describe a software structure of the mobile terminal 100.

Figure 2B:
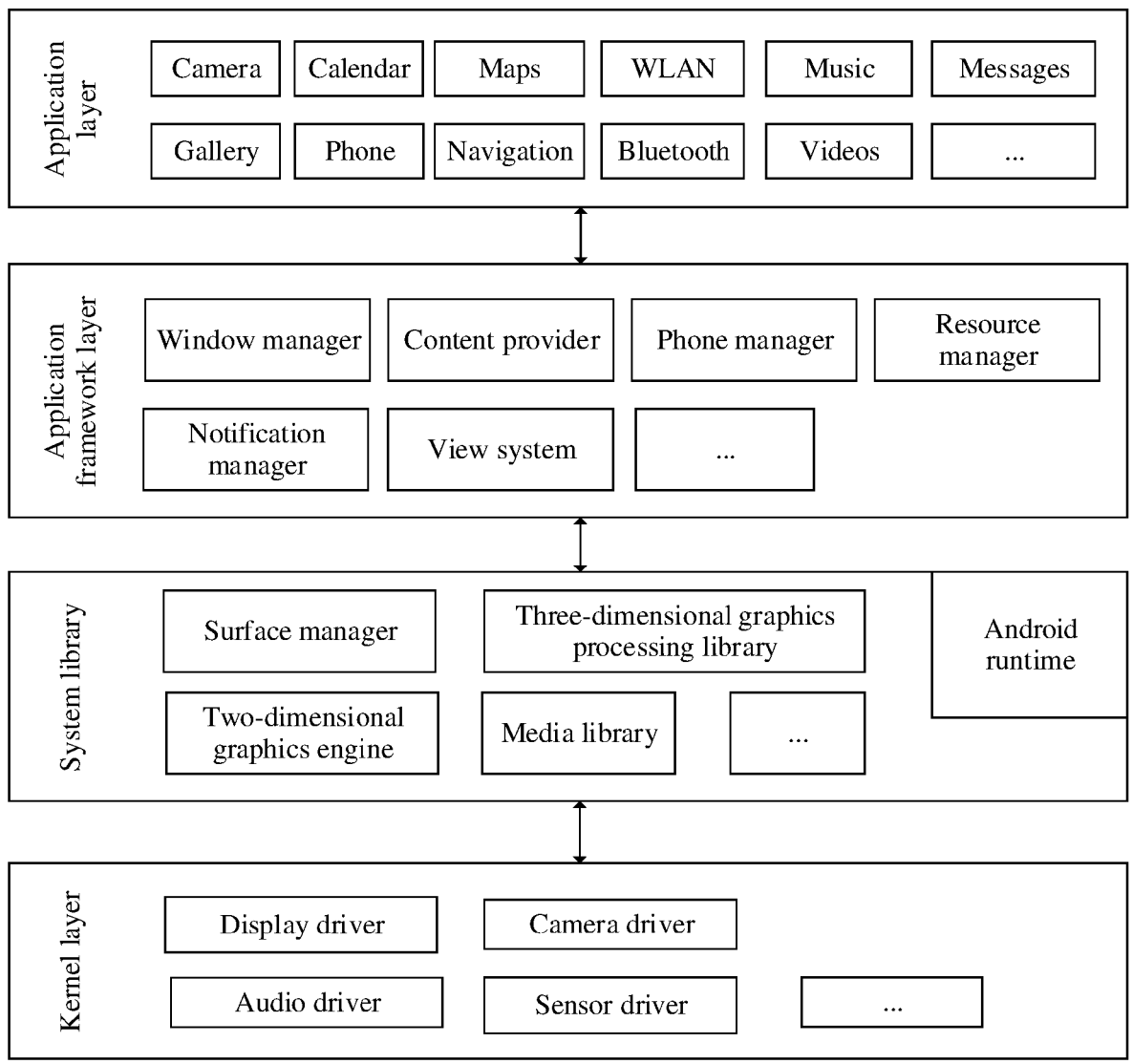
FIG. 2B is a schematic diagram of a software structure of a mobile terminal according to an embodiment of this application.

FIG. 2B is a block diagram of a software structure of a mobile terminal 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2B, the application package may include applications such as Camera, Gallery, Calendar, Phone, Maps, Navigation, WLAN, Bluetooth™, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including a notification icon of Messages may include a text display view and a picture display view.

The phone manager is configured to provide a communication function of the mobile terminal 100, for example, management of a call status (including answering, declining, or the like).

The resource manager provides an application with various resources such as a localized character string, an icon, a picture, a layout file, and a video file.

The notification manager enables an application to display notification information in a status bar, and may be configured to convey a notification message. The notification manager may automatically disappear after a short pause without requiring user interaction. For example, the notification manager is configured to notify download completion, and give a message notification. The notification manager may alternatively be a notification that appears in a top status bar of the system in a form of a graph or a scroll bar text, for example, a notification of an application running in the background, or may be a notification that appears on the screen in a form of a dialog window. For example, the status bar prompts text information, a prompt tone is emitted, the mobile terminal vibrates, and an indicator blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of function modules, such as a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library can support a plurality of audio and video encoding formats, such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3:
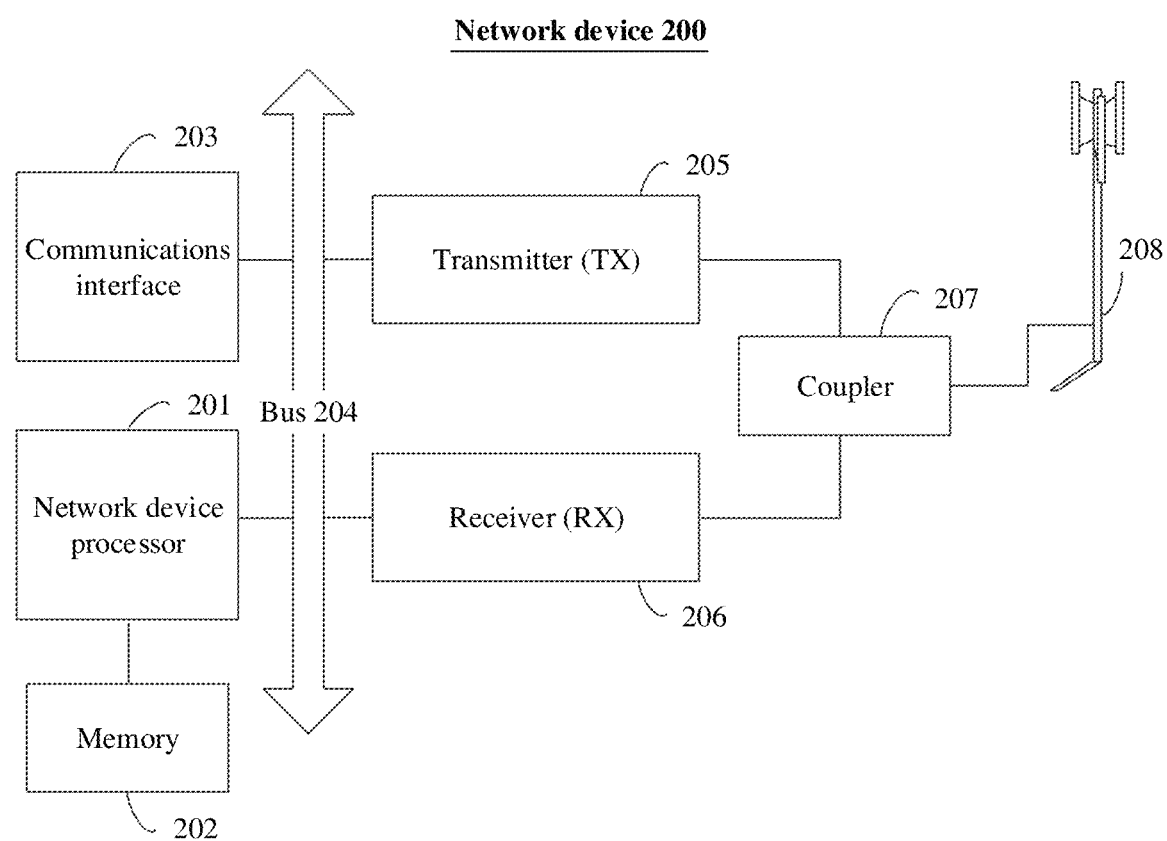
FIG. 3 is a schematic diagram of a hardware structure of a network device according to an embodiment of this application.

FIG. 3 is a schematic diagram of a structure of a network device 200 according to an embodiment of this application. The network device 200 shown in FIG. 3 may be the MME or the eNodeB in the communications system 10 shown in FIG. 1. This is not limited in this embodiment of this application.

As shown in FIG. 3, the network device 200 may include one or more processors 201, a memory 202, a communications interface 203, a transmitter 205, a receiver 206, a coupler 207, and an antenna 208. These components may be connected by using a bus 204 or in another manner. An example in which these components are connected by using a bus is used in FIG. 3.

The communications interface 203 may be used by the network device 200 to communicate with another communications device, for example, a mobile terminal or another network device. Specifically, the communications interface 203 may be an LTE communications interface. Not limited to a wireless communications interface, the network device 200 may be further equipped with a wired communications interface 203 to support wired communication. For example, a backhaul link between one network device 200 and another network device 200 may be a wired communication connection.

In some embodiments of this application, the transmitter 205 and the receiver 206 may be considered as one wireless modem. The transmitter 205 may be configured to perform transmission processing on a signal output by the processor 201. The receiver 206 may be configured to receive the signal. In the network device 200, there may be one or more transmitters 205 and one or more receivers 206. The antenna 208 may be configured to convert electromagnetic energy in a transmission line into an electromagnetic wave in free space, or convert an electromagnetic wave in the free space into electromagnetic energy in the transmission line. The coupler 207 may be configured to split a mobile communication signal into a plurality of channels, and allocate the signals to a plurality of receivers 206. It may be understood that the antenna 208 of the network device may be implemented as a large-scale antenna array.

The memory 202 is coupled to the processor 201, and is configured to store various software programs and/or a plurality groups of instructions. Specifically, the memory 202 may include a high-speed random access memory, and may further include a nonvolatile memory, such as one or more magnetic disk storage devices, a flash memory, or another nonvolatile solid-state storage device.

The memory 202 may store an operating system (a system for short below), such as uCOS, VxWorks, RTLinux, or another embedded operating system. The memory 202 may further store a network communication program. The network communication program may be used to communicate with one or more additional devices, one or more mobile devices, and one or more network devices.

In this embodiment of this application, the processor 201 may be configured to read and execute a computer-readable instruction. Specifically, the processor 201 may be configured to invoke a program stored in the memory 202, and execute an instruction included in the program. For example, the program may be a program for implementing, on a side of the network device 200, a method for accessing an LTE network by a mobile terminal provided in one or more embodiments of this application.

It should be noted that the network device 200 shown in FIG. 3 is merely an implementation of this embodiment of this application. In actual application, the network device 200 may further include more or fewer components. This is not limited herein.

With reference to the mobile communications system 10 shown in FIG. 1, the mobile terminal 100 shown in FIG. 2A and FIG. 2B, and the network device 200 shown in FIG. 3, the following describes in detail the method for accessing an LTE network by a mobile terminal provided in embodiments of this application.

The following describes the method for accessing an LTE network by a mobile terminal provided in embodiments of this application by using two embodiments.

(1) Embodiment 1

In Embodiment 1, a mobile terminal 100 starts a T3402 timer and disables an E-UTRA capability (disable the E-UTRA capability) when the mobile terminal fails to attach (attach) and a quantity of attach (attach) attempts reaches a threshold. The mobile terminal 100 attempts to access an LTE network again after the T3402 timer expires. A value of the T3402 timer is determined by the mobile terminal 100 based on a moving speed of the mobile terminal 100.

Before proceeding to Embodiment 1, an attach (attach) procedure used in Embodiment 1 is described first.

Attach (attach) is a process in which the mobile terminal 100 registers with an EPC to obtain a service; and the EPC allocates an internet protocol (internet protocol, IP) address, establishes a connection, establishes a default bearer, and generates a security context for the mobile terminal 100. The mobile terminal 100 may initiate attach (attach) after being powered on, or may initiate attach (attach) when roaming occurs. It may be understood that, for both an occasion and a purpose of initiating the attach (attach) by the mobile terminal 100, refer to related content in TS24.301. Details are not described herein.

Figure 4:
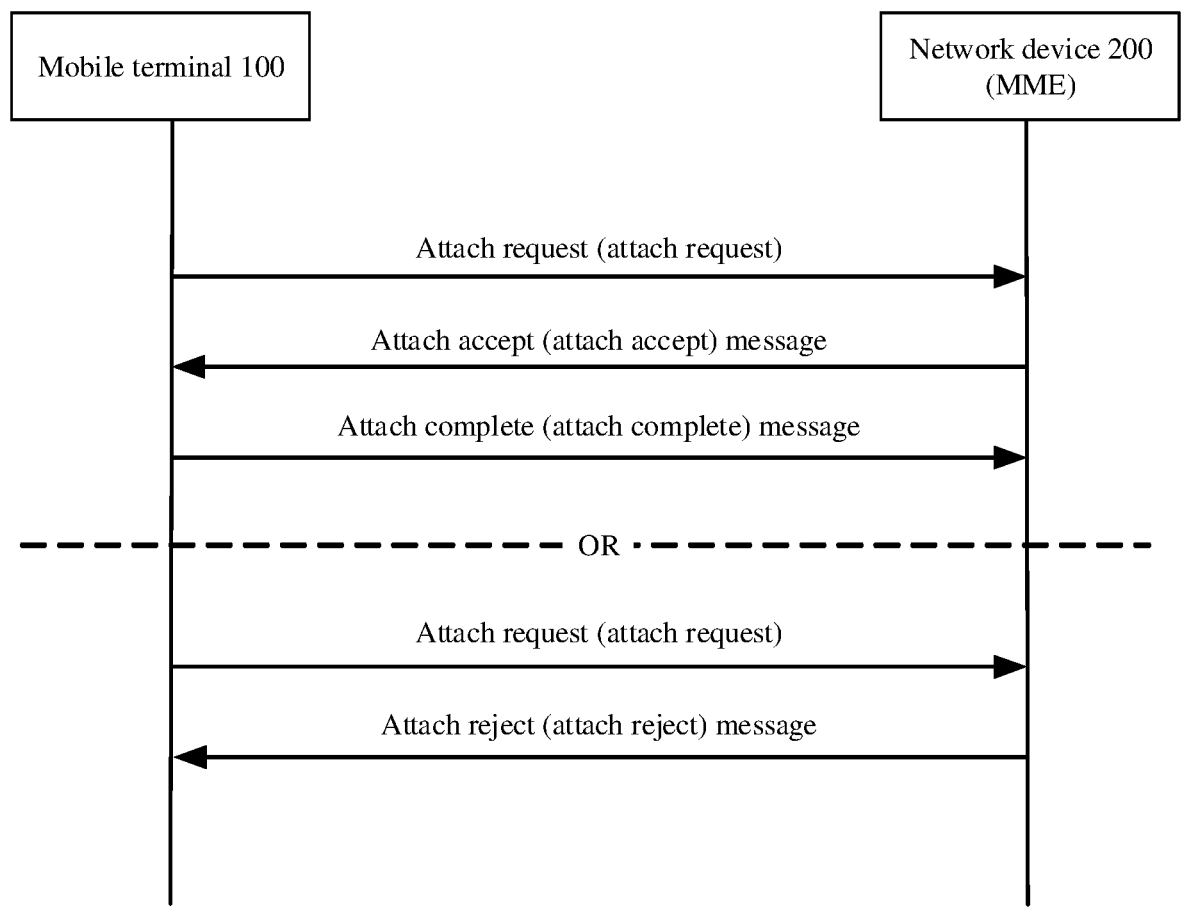
FIG. 4 is a schematic diagram of an attach (attach) procedure of a mobile terminal according to an embodiment of this application.

FIG. 4 shows an attach (attach) procedure of the mobile terminal 100. For details about the procedure, refer to related content defined in TS24.301 5.5.1 formulated by the 3GPP. A network device 200 in FIG. 4 may be an MME, and messages transmitted between the MME and the mobile terminal 100 in FIG. 4 are all transparently transmitted by using an eNodeB.

As shown in FIG. 4, the mobile terminal 100 first sends an attach request (attach request) to the network device 200, and starts a T3410 timer at the same time. For the value of the T3402 timer, refer to provisions in TS24.301. For example, the value may be 15 seconds.

In a possible case, after receiving the attach request, the network device 200 sends an attach accept message (attach accept) to the mobile terminal 100. When receiving the attach accept message, the mobile terminal 100 stops the T3410 timer, and then replies with an attach complete (accept complete) message. In this case, the attach succeeds.

In another possible case, after receiving the attach request, the network device 200 sends an attach reject message (attach reject) to the mobile terminal 100. When receiving the attach reject message, the mobile terminal 100 stops the T3410 timer. In this case, the attach fails.

There may be a plurality of reasons why the mobile terminal 100 fails to attach (attach). This is not limited in this embodiment of this application. For example, the reasons may include: network congestion is caused if an excessive quantity of devices are currently attached to the network device 200, a signal of the network device 200 is poor, severe interference exists between the mobile terminal 100 and the network device 200, the mobile terminal 100 does not support a public land mobile network (public land mobile network, PLMN) in which the mobile terminal 100 is currently located, the PLMN in which the mobile terminal 100 is currently located does not support an EPS service, a service option requested by the mobile terminal 100 is not configured in the PLMN in which the mobile terminal 100 is currently located, and so on.

In Embodiment 1, the mobile terminal 100 may determine that the current attach (attach) fails in any one of the following cases:

1. The mobile terminal 100 receives an attach reject (attach reject) message after sending an attach request (attach request).

2. No response message from the network device 200 is received during operation of the T3410 timer after an attach request (attach request) is sent by the mobile terminal 100.

Figure 5:
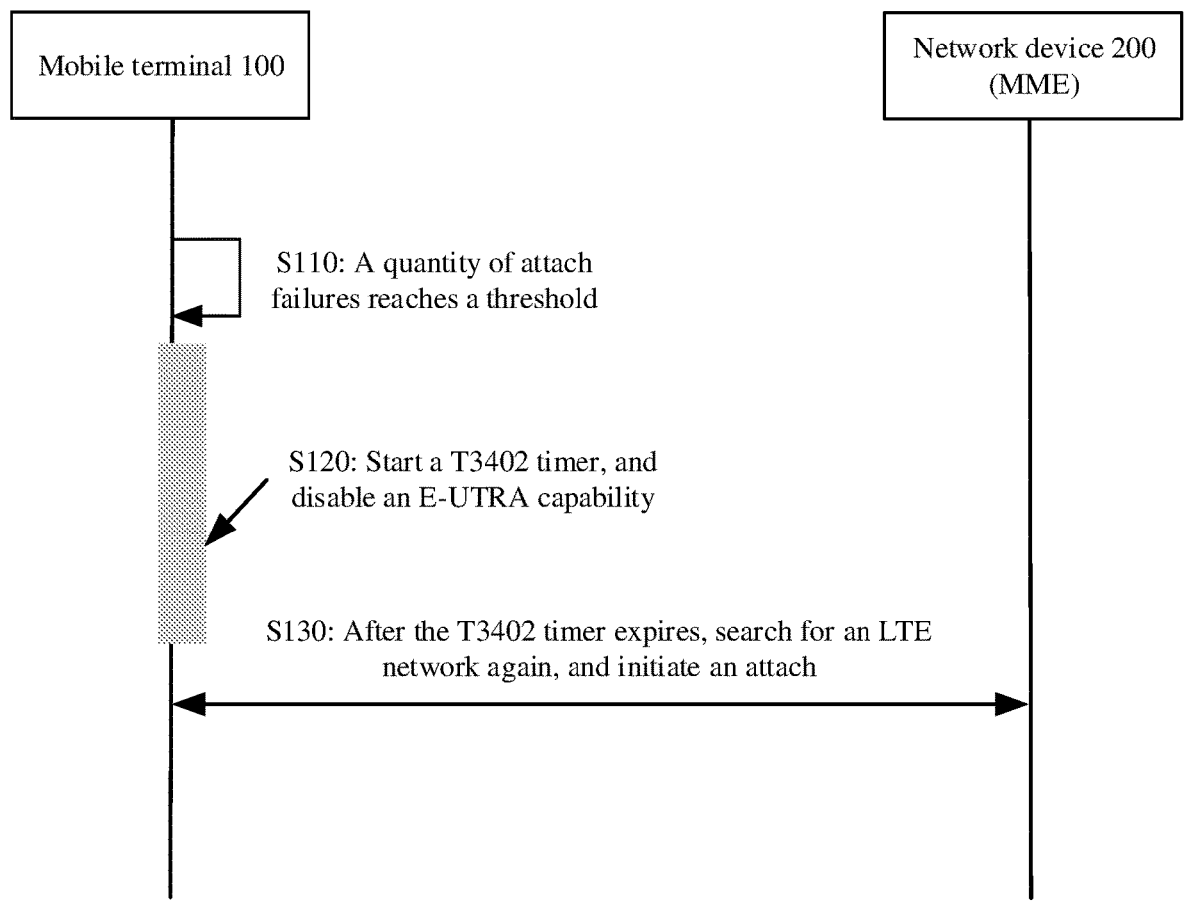
FIG. 5 is a schematic flowchart of a method for accessing an LTE network by a mobile terminal according to an embodiment of this application.

FIG. 5 shows a procedure of a method for accessing an LTE network by a mobile terminal according to Embodiment 1.

As shown in FIG. 5, the method may include the following steps.

S110: A mobile terminal 100 fails to attach (attach), and a quantity of attach (attach) attempts reaches a threshold.

For specific cases of an attach (attach) failure of the mobile terminal 100, refer to related descriptions in FIG. 4. For example, the cases may include that the mobile terminal 100 receives an attach reject (attach reject) message, or no response message from the network device 200 is received during the operation of the T3410 timer after the attach request (attach request) is sent.

The quantity of attach (attach) attempts of the mobile terminal 100 may be determined by using a value of an attach attempt counter (attach attempt counter). Specifically, the mobile terminal 100 may maintain the attach attempt counter. The attach attempt counter is configured to indicate a quantity of times for which the mobile terminal 100 attempts to attach but is rejected. A maximum value of the attach attempt counter is the threshold.

It may be understood that, for reset and increment of 1 of the attempt counter, refer to the content in TS24.301 5.5.1. The following briefly describes the reset and the increment of 1 of the attach attempt counter, and details are not described herein.

The threshold may be preset, for example, may be 5. The threshold is not limited in this embodiment of this application.

In S110, a quantity of attach failures of the mobile terminal 100 reaches the threshold.

In a specific example, S110 may be: A mobile device 100 successively sends an attach request (attach request) for n times, where during operation of the T3410 timer each time after the attach request is sent, no response message from the network device 200 is received, or an attach reject message sent by the network device 200 is received. Herein, n is the threshold. One possibility is: The mobile device 100 starts the T3410 timer after sending the attach request (attach request); if no response message from the network device 200 is received during the operation of the T3410 timer, an RRC connection between the mobile device 100 and the network device 200 is released after the T3410 timer expires; and then, the attach request (attach request) is sent again after a period of time (for example, 10 seconds). Another possibility is: The mobile terminal 100 starts the T3410 timer after sending the attach request (attach request); if an attach reject (attach reject) message is received during the operation of the T3410 timer, an RRC connection between the mobile terminal 100 and the network device 200 is released; and then, the attach request (attach request) is sent again after a period of time (for example, 10 seconds).

In this embodiment of this application, in S110, the threshold quantity of attach failures of the mobile terminal 100 may be for a same cell, or may be for different cells. This is not limited herein. In S110, the mobile terminal 100 may be in a static state, or may be in a moving state. This is not limited herein.

In a specific embodiment, in S110, when the mobile terminal 100 is in a static state, a quantity of attach failures to a same cell may reach the threshold.

S120: The mobile terminal 100 starts a T3402 timer, and disables an E-UTRA capability (disable the E-UTRA capability), where duration of the T3402 timer is determined by a moving speed of the mobile terminal 100.

The mobile terminal 100 may start the T3402 timer and disable the E-UTRA capability at the same time. After the T3402 timer expires, that is, after the duration of the T3402 timer, the mobile terminal 100 recovers the E-UTRA capability.

In a specific example, according to the definition in TS24.301 10.2, that is, CAUSE OF START T3402: At attach failure and the attempt counter is equal to 5, the mobile device starts the T3402 timer when an attach failure occurs and a quantity of attach attempts reaches 5.

In this embodiment of this application, the duration of the T3402 timer is determined by the mobile terminal 100 based on the moving speed of the mobile terminal 100. The mobile terminal 100 may detect the moving speed thereof after S110, or may periodically detect the moving speed thereof after being powered on. This is not limited in this embodiment of this application. In this embodiment of this application, the mobile terminal 100 may detect the moving speed thereof in the following manners:

(1) The mobile terminal 100 may be configured to obtain real-time location information of the mobile terminal 100 by using a GNSS, such as a GPS, a BDS, a GLONASS, a QZSS, or an SBAS; and subsequently, based on the real-time location information of the mobile terminal 100 at any two time points, determine a moving distance of the mobile terminal 100 between the two time points and calculate the moving speed.

(2) The mobile terminal 100 may also calculate the moving speed by using a signal detected by the GNSS and through an original Doppler observation value or a Doppler observation value obtained by real time kinematic.

(3) The mobile terminal 100 may measure an acceleration value, and integrate measured acceleration to obtain the moving speed.

(4) When located on a public vehicle (such as a high-speed railway, a motor vehicle, or an aircraft), the mobile terminal 100 may use a short-range communications technology such as BT, Wi-Fi, NFC, or the light fidelity technology (light fidelity, LiFi) to establish a short-range communication connection to the public vehicle, and then obtain, based on the short-range communication connection, speed information shared by the public vehicle.

In Embodiment 1 of this application, the duration of the T3402 timer is determined by the mobile terminal 100 based on the moving speed of the mobile terminal 100. The following describes how the mobile terminal 100 determines the duration of the T3402 timer by using two different cases:

(1) When the moving speed of the mobile terminal 100 reaches a first value, the duration of the T3402 timer determined by the mobile terminal 100 is less than default duration of the T3402 timer. Herein, the first value may be preset, for example, may be 200 km/h. This is not limited in this embodiment of this application.

The following describes several manners in which the mobile terminal 100 determines the duration of the T3402 timer when the moving speed of the mobile terminal 100 reaches the first value.

a. When the moving speed of the mobile terminal 100 is equal to the first value, the duration of the T3402 timer is equal to first duration. When the moving speed of the mobile terminal 10 is equal to a second value, the duration of the T3402 timer is equal to second duration. The second value is greater than the first value, the second duration is less than the first duration, and both the first duration and the second duration are less than the default duration of the T3402 timer. In other words, a higher moving speed indicates shorter duration of the T3402 timer determined by the mobile terminal 100.

In some embodiments, the duration of the T3402 timer determined by the mobile terminal 100 varies with the moving speed.

In some other embodiments, the duration of the T3402 timer determined by the mobile terminal varies with an interval in which the moving speed is located. Specifically, the mobile terminal 100 may classify moving speeds greater than or equal to the first value into a plurality of intervals that do not overlap with each other, where each interval corresponds to one duration, and a higher moving speed in the interval indicates shorter duration corresponding to the interval. Interval division and duration corresponding to each interval may be preset. This is not limited in this embodiment of this application. For example, the mobile terminal 100 may classify moving speeds greater than 200 km/h into the following intervals: 200 km/h≤moving speed <220 km/h, 220 km/h≤moving speed <250 km/h, and 250 km/h≤moving speed <300 km/h. Duration corresponding to the intervals may be: 10 minutes, 8 minutes, and 6 minutes respectively. In this way, when the moving speed of the mobile terminal 100 reaches the first value, the duration of the T3402 timer determined by the mobile terminal 100 is duration corresponding to an interval in which a current moving speed of the mobile terminal 100 is located.

b. When the moving speed of the mobile terminal 100 reaches the first value, regardless of a specific value of the moving speed, a value of the duration of the T3402 timer is fixed second default duration. The second default duration is less than the default duration of the T3402 timer. The second default duration may be preset, for example, may be set to 8 minutes. This is not limited herein.

(2) When the moving speed of the mobile terminal 100 is less than the first value, the duration of the T3402 timer determined by the mobile terminal 100 may be kept the default duration.

In this embodiment of this application, that the mobile terminal 100 disables the E-UTRA capability (disable the E-UTRA capability) means that the mobile terminal no longer works on a 4G frequency band, and does not search for any signal on the 4G frequency band. Disabling the E-UTRA capability by the mobile terminal may also be considered as disabling the LTE network by the mobile terminal.

It may be understood that after disabling the E-UTRA capability, the mobile terminal 100 may further work on another frequency band, search for a signal on another frequency band, and access a network of another standard. For example, the mobile terminal 100 may further search for a signal on a 5G/3G/2G frequency band, and access a 5G/3G/2G network and a future network. In some embodiments, the mobile terminal 100 may preset a priority, and access a network of another standard according to a priority order. For example, the mobile terminal 100 may preferentially access a 5G network, and then a 3G network, and finally a 2G network.

Not limited to S120 that the mobile terminal 100 disables the E-UTRA capability during operation of the T3402 timer, in some other embodiments, the mobile terminal 100 may only prohibit a search for a cell that encounters attach failure in S110 during the operation of the T3402 timer, but may further search for another cell of an LTE standard. In this way, a range of cells that can be searched by the mobile terminal 100 can be expanded, thereby further improving efficiency of accessing the LTE network by the mobile terminal 100. In a specific example, if the threshold quantity of attach failures in S110 are all for a same cell, the mobile terminal 100 may prohibit a search for the cell during the operation of the T3402 timer.

S130: After the T3402 timer expires, the mobile terminal 100 searches for an LTE network again, and initiates an attach (attach).

To be specific, after the duration of the T3420, the mobile terminal 100 may recover the E-UTRA capability, search for the LTE network again, and initiate an attach (attach) to access the LTE network.

S130 is a procedure in which the mobile terminal 100 searches for an LTE network and initiates an attach. The procedure may be specifically divided into the following steps. 1. Select a cell.

The mobile terminal 100 first searches for a PLMN requested by a non-access stratum (non-access stratum, NAS), scans all radio frequency RF channels in an E-UTRA frequency band (that is, the 4G frequency band) to find the PLMN, searches for a cell with a strongest signal, and reads system information to determine the PLMN. If it is determined that all cell selection criteria meet an S criterion, the mobile terminal 100 further camps on the selected cell. That the mobile terminal 100 camps on a cell means that the LTE network is found by the mobile terminal 100.

2. Register with the Cell.

The mobile terminal 100 first performs a random access process, and initiates an attach (attach) request for registration after an RRC connection is successfully established. After the registration is successful, the LTE network is successfully accessed. Subsequently, various services, such as a data service and a voice service, that are provided by a network side can be used.

In short, after the T3402 timer expires, the mobile terminal 100 may search for the LTE network again, that is, search for a 4G signal transmitted by a 4G base station. After the LTE network is found, an attach (attach) may be initiated to the corresponding network device 200. For a procedure in which the mobile terminal 100 initiates an attach (attach), refer to the procedure shown in FIG. 4. For example, the mobile terminal 100 may send an attach (attach) request to the network device 200 again.

It may be understood that, when the mobile terminal 100 moves quickly, locations at which the mobile terminal 100 performs S110 and S130 may change greatly. Therefore, network devices 200 interacting with the mobile terminal 100 during the attach (attach) in S110 and S130 may be a same network device, or may be different network devices. In addition, when the mobile terminal 100 attempts to attach (attach) for several times but fails in S110, there may be one or more network devices interacting with the mobile terminal 100. This is not limited in this embodiment of this application. In this embodiment of this application, a network device interacting with the mobile terminal 100 during the attach (attach) in S110 may be referred to as a second network device, and a network device interacting with the mobile terminal 100 during the attach (attach) in S130 may be referred to as a first network device.

When the mobile terminal 100 moves quickly, when performing S130, the mobile terminal 100 may have already entered a coverage area in which the LTE network is in a good condition. In this way, after S130 is performed, the mobile terminal 100 may receive an attach accept message (attach accept) sent by the network device 200, and may reply with an attach complete (accept complete) message to the network device 200. In this case, the mobile terminal 100 is successfully attached to, that is, successfully accesses the LTE network.

According to the technical solution provided in Embodiment 1, after a plurality of attach (attach) failures, if the mobile terminal 100 moves to the coverage area in which the LTE network is in a good condition, the mobile terminal 100 may re-access the LTE network after the T3402 timer determined by the mobile terminal 100 expires, without waiting for the default duration, that is, 12 minutes. In other words, the mobile terminal 100 can quickly access the LTE network, thereby improving efficiency of accessing the LTE network and providing a user with good use experience of the mobile terminal.

The following briefly describes the reset and the increment of 1 of the attach attempt counter.

The mobile terminal 100 may reset the attach attempt counter to 0 in the following cases.

1. The mobile terminal 100 is powered on.
2. A universal subscriber identity module (universal subscriber identity module, USIM) is inserted.
3. The attach (attach) succeeds.
4. A new TA is entered.
5. The T3402 timer expires.
6. A T3346 timer is started.
7. A new PLMN is selected.
8. An attach reject message (attach reject) is received, and a carried cause is #11, #12, #13, #14, #15, #25, or #35.
9. The network side initiates a detach (detach), and a carried cause is #11, #12, #13, #14, #15, or #25.

According to the following content in TS24.301 5.5.1.2.6: For the cases b, c, d, 1 when the "Extended wait time" is ignored, and la when the "Extended wait time CP data" is ignored, if the attach request is neither for emergency bearer services nor for initiating a PDN connection for emergency bearer services with attach type not set to "EPS emergency attach", the attach attempt counter shall be incremented, unless it was already set to 5.

(b) Lower layer failure or release of the NAS signalling connection without "Extended wait time" and without "Extended wait time CP data" received from lower layers before the ATTACH ACCEPT or ATTACH REJECT message is received.

The attach procedure shall be aborted, and the UE shall proceed as described below.

(c) T3410 timeout

The UE shall abort the attach procedure and proceed as described below. The NAS signalling connection, if any, shall be released locally.

(d) ATTACH REJECT, other EMM cause values than those treated in subclause 5.5.1.2.5, and cases of EMM cause values #22, #25 and #31, if considered as abnormal cases according to subclause 5.5.1.2.5.

(1) "Extended Wait Time" from the Lower Layers

If the ATTACH REQUEST message contained the low priority indicator set to "MS is configured for NAS signalling low priority", the UE shall start timer T3346 with the "Extended wait time" value and reset the attach attempt counter.

If the ATTACH REQUEST message did not contain the low priority indicator set to "MS is configured for NAS signalling low priority", the UE is operating in NB-S1 mode and the UE is not a UE configured to use AC11-15 in selected PLMN, then the UE shall start timer T3346 with the "Extended wait time" value and reset the attach attempt counter.

In other cases the UE shall ignore the "Extended wait time".

The UE shall abort the attach procedure, stay in the current serving cell, change the state to EMM-DEREGISTERED.ATTEMPTING-TO-ATTACH and apply the normal cell reselection process.

The UE shall proceed as described below.

(La) "Extended Wait Time CP Data" from the Lower Layers

If the UE is operating in NB-S1 mode, the UE shall start the timer T3346 with the "Extended wait time CP data" value and reset the attach attempt counter.

In other cases the UE shall ignore the "Extended wait time CP data".

The UE shall abort the attach procedure, stay in the current serving cell, change the state to EMM-DEREGISTERED.ATTEMPTING-TO-ATTACH and apply the normal cell reselection process.

The UE shall proceed as described below.

The mobile terminal 100 (that is, the UE) may increment 1 to the value of the attach attempt counter in the following cases.

For the cases b, c, d, and 1, if "extended wait time" is ignored, "extended wait time CP data" is ignored for la. If the attach request is neither for emergency bearer services nor for initiating a PDN connection for emergency bearer services with an attach type not set to "EPS emergency attach", if the value of the attach attempt counter is less than 5, the value of the attach attempt counter is incremented by 1.

The case b means that when there is a lower-layer failure or a NAS signalling connection is released, the mobile terminal 100 does not receive "extended wait time" and "extended wait time CP data" from a lower layer before receiving an attach accept (attach accept) message or an attach reject (attach reject) message. The attach process may be aborted and the mobile terminal 100 may proceed as described below.

The case c means that the T3410 expires. The mobile terminal 100 may abort the attach process and proceed as described below. A NAS signalling connection (if any) shall be released locally.

The case d refers to attach reject: other EMM cause values than those treated in clause 5.5.1.2.5, and cases of EMM cause values #22, #25 and #31, if considered as abnormal cases according to clause 5.5.1.2.5.

The case I refers to "extended wait time" at a lower layer. If the attach reject (attach reject) message contains a low priority indicator that is set to "MS is configured for NAS signalling low priority", the mobile terminal 100 shall start the T3346 by using an "extended wait time" value, and reset a connection counter. If the attach request does not contain a low priority indicator that is set to "MS is configured for NAS signalling low priority", it indicates that the mobile terminal 100 is operating in an NB-S1 mode. Moreover, if the mobile terminal 100 is not configured to use AC11-15 in the selected PLMN, the mobile terminal 100 shall start the T3346 by using the "extended wait time" value, and reset the connection counter. In other cases, the mobile terminal 100 may ignore the "extended wait time". The mobile terminal 100 may abort the attach process, stay in a current serving cell, change a state to EMM-DEregister.ATTEMPTING-TO-ATTACH, and apply a normal cell reselection process. The mobile terminal 100 may proceed as described below.

The case la refers to "extended wait time CP data" from a lower layer. If the mobile terminal 100 is operating in the NB-S1 mode, the mobile terminal 100 shall start the T3346 by using an "extended wait time CP data" value, and reset the connection counter.

In other cases, the mobile terminal 100 may ignore the "extended wait time CP data". The mobile terminal 100 may abort the attach process, stay in a current serving cell, change a state to EMM-DEregister.ATTEMPTING-TO-ATTACH, and apply a normal cell reselection process. The mobile terminal 100 may proceed as described below.

(2) Embodiment 2

In Embodiment 2, a mobile terminal 100 starts a T3402 timer and disables an E-UTRA capability (disable the E-UTRA capability) when the mobile terminal 100 fails to perform TAU and a quantity of TAU attempts reaches a threshold. The mobile terminal 100 attempts to access an LTE network after the T3402 timer expires. A value of the T3402 timer is determined by the mobile terminal 100 based on a moving speed of the mobile terminal 100.

Before proceeding to Embodiment 2, a TAU procedure used in Embodiment 2 is described first.

TAU is a process in which the mobile terminal 100 registers TA-level location information on a network side, periodically indicates an online status, performs load balancing on the network side, updates a parameter (for example, a network capability) of the mobile terminal 100, and so on. The mobile terminal 100 may initiate TAU when a new TA is entered and the TA is not in a TA list stored in the mobile terminal 100, TAU is initiated on the network side, and the parameter needs to be updated. It may be understood that, for both an occasion and a purpose of initiating the TAU by the mobile terminal 100, refer to related content in TS24.301. Details are not described herein.

Figure 6:
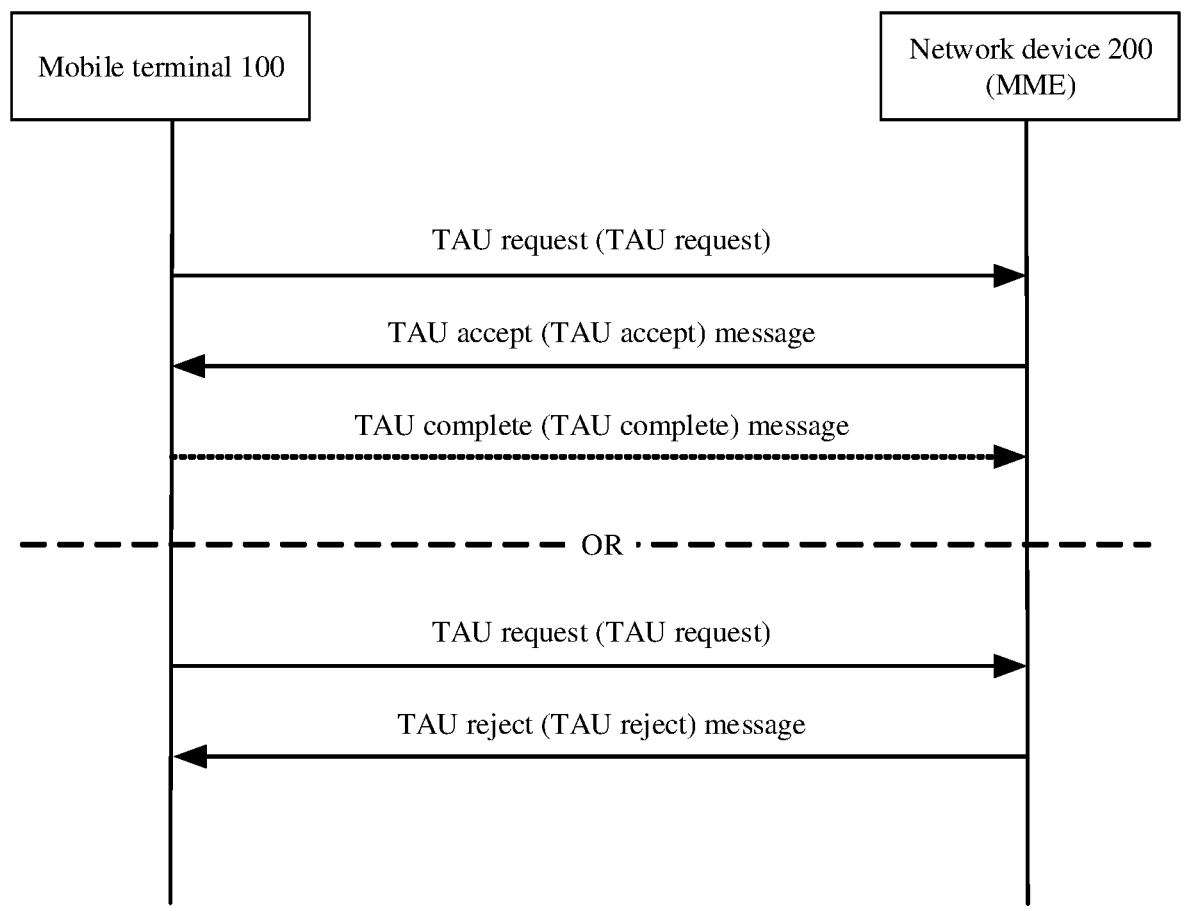
FIG. 6 is a schematic diagram of a TAU procedure of a mobile terminal according to an embodiment of this application.

FIG. 6 shows a TAU procedure of the mobile terminal 100. For details about the procedure, refer to related content defined in TS24.3015.5.3 formulated by the 3GPP. A network device 200 in FIG. 6 may be an MME, and messages transmitted between the MME and the mobile terminal 100 in FIG. 6 are all transparently transmitted by using an eNodeB.

As shown in FIG. 6, the mobile terminal 100 first sends a TAU request (tracking area update request) to the network device 200, and starts a T3430 timer at the same time. For a value of the T3430 timer, refer to provisions in TS24.301. For example, the value may be 15 seconds.

In a possible case, after receiving the TAU request, the network device 200 sends a TAU accept message (tracking area update accept) to the mobile terminal 100. When receiving the TAU accept message, the mobile terminal 100 stops the T3430 timer. If the mobile terminal 100 is configured with a global unique temporary UE identity (globally unique temporary UE identity, GUTI), a TAU complete (tracking area update complete) message may be replied. In this case, the attach succeeds.

In another possible case, after receiving the TAU request, the network device 200 sends a TAU reject message (tracking area update reject) to the mobile terminal 100. When receiving the TAU reject message, the mobile terminal 100 stops the T3430 timer. In this case, the TAU fails.

There may be a plurality of reasons why the mobile terminal 100 fails to perform TAU. This is not limited in this embodiment of this application. For example, the reasons may include: network congestion is caused if an excessive quantity of devices are currently attached to the network device 200, a signal of the network device 200 is poor, severe interference exists between the mobile terminal 100 and the network device 200, the mobile terminal 100 does not support a public land mobile network (public land mobile network, PLMN) in which the mobile terminal 100 is currently located, the PLMN in which the mobile terminal 100 is currently located does not support an EPS service, a service option requested by the mobile terminal 100 is not configured in the PLMN in which the mobile terminal 100 is currently located, and so on.

In Embodiment 2, the mobile terminal 100 may determine that the current TAU fails in any one of the following cases.

1. The mobile terminal 100 receives a TAU reject message after sending a TAU request.

2. No response message from the network device 200 is received during operation of the T3430 timer after a TAU request is sent by the mobile terminal 100.

Figure 7:
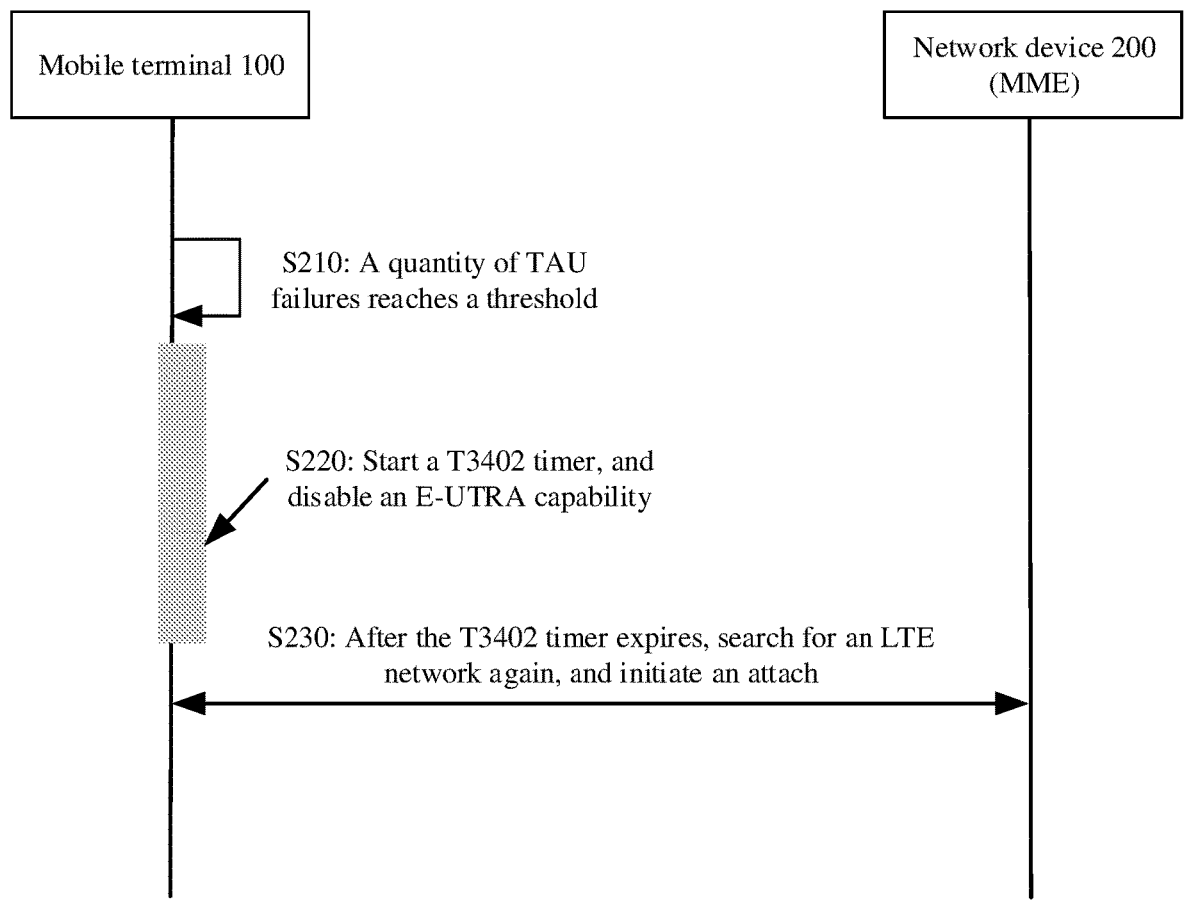
FIG. 7 is a schematic flowchart of another method for accessing an LTE network by a mobile terminal according to an embodiment of this application.

FIG. 7 shows a procedure of a method for accessing an LTE network by a mobile terminal according to Embodiment 2.

As shown in FIG. 7, the method may include the following steps.

S210: A mobile terminal 100 fails to perform TAU, and a quantity of TAU attempts reaches a threshold.

For specific cases of a TAU failure of the mobile terminal 100, refer to related descriptions in FIG. 6. For example, the cases may include that the mobile terminal 100 receives a TAU reject message, or no response message from the network device 200 is received during the operation of the T3430 timer after the TAU request is sent.

The quantity of TAU attempts of the mobile terminal 100 may be determined by using a value of a TAU attempt counter (TAU attempt counter). Specifically, the mobile terminal 100 may maintain the TAU attempt counter. The TAU attempt counter is configured to indicate a quantity of times for which the mobile terminal 100 attempts to perform TAU but is rejected. A maximum value of the TAU attempt counter is the threshold.

It may be understood that, for reset and increment of 1 of the attempt counter, refer to the content in TS24.301 5.5.1. The following briefly describes the reset and the increment of 1 of the TAU attempt counter, and details are not described herein.

The threshold may be preset, for example, may be 5. The threshold is not limited in this embodiment of this application.

In S210, a quantity of TAU failures of the mobile terminal 100 reaches the threshold.

In a specific example, S210 may be: A mobile device 100 successively sends a TAU request for n times, where during operation of the T3430 timer each time after the TAU request is sent, no response message from the network device 200 is received, or a TAU reject message sent by the network device 200 is received. Herein, n is the threshold. One possibility is: The mobile device 100 starts the T3430 timer after sending the TAU request; if no response message from the network device 200 is received during the operation of the T3430 timer, an RRC connection between the mobile device 100 and the network device 200 is released after the T3430 timer expires; and then, the TAU request is sent again after a period of time (for example, 10 seconds). Another possibility is: The mobile terminal 100 starts the T3430 timer after sending the TAU request; if a TAU reject message is received during the operation of the T3430 timer, an RRC connection between the mobile terminal 100 and the network device 200 is released; and then, the TAU request is sent again after a period of time (for example, 10 seconds).

In this embodiment of this application, in S210, the threshold quantity of TAU failures of the mobile terminal 100 may be for a same cell, or may be for different cells. This is not limited herein. In S210, the mobile terminal 100 may be in a static state, or may be in a moving state. This is not limited herein.

In a specific embodiment, in S210, the mobile terminal 100 may be in a static state, and a quantity of TAU failures in a same cell reaches a threshold.

S220: The mobile terminal 100 starts a T3402 timer, and disables an E-UTRA capability (disable the E-UTRA capability), where duration of the T3402 timer is determined by a moving speed of the mobile terminal 100.

The mobile terminal 100 may start the T3402 timer and disable the E-UTRA capability at the same time. After the T3402 timer expires, that is, after the duration of the T3402 timer, the mobile terminal 100 recovers the E-UTRA capability.

In a specific example, according to the definition in TS24.301 10.2, that is, CAUSE OF START T3402: At tracking area updating failure and the attempt counter is equal to 5, the mobile device starts the T3402 timer when a TAU failure occurs and a quantity of TAU attempts reaches 5.

In this embodiment of this application, a manner and an occasion for the mobile terminal 100 to detect the moving speed of the mobile terminal 100 are the same as those in Embodiment 1. For details, refer to related descriptions of S120 in Embodiment 1. Details are not described herein again.

In Embodiment 2 of this application, a manner in which the mobile terminal 100 determines the duration of the T3402 timer based on the moving speed of the mobile terminal 100 is the same as that in Embodiment 1. For details, refer to related descriptions of S120 in Embodiment 1. Details are not described herein.

In this embodiment of this application, that the mobile terminal 100 disables the E-UTRA capability (disable the E-UTRA capability) means that the mobile terminal no longer works on a 4G frequency band, and does not search for any signal on the 4G frequency band. Disabling the E-UTRA capability by the mobile terminal may also be considered as disabling the LTE network by the mobile terminal.

It may be understood that after disabling the E-UTRA capability, the mobile terminal 100 may further work on another frequency band, search for a signal on another frequency band, and access a network of another standard. For example, the mobile terminal 100 may further search for a signal on a 5G/3G/2G frequency band, and access a 5G/3G/2G network and a future network. In some embodiments, the mobile terminal 100 may preset a priority, and access a network of another standard according to a priority order. For example, the mobile terminal 100 may preferentially access a 5G network, and then a 3G network, and finally a 2G network.

Not limited to S220 that the mobile terminal 100 disables the E-UTRA capability during operation of the T3402 timer, in some other embodiments, the mobile terminal 100 may only prohibit a search for a cell that encounters TAU failure in S210 during the operation of the T3402 timer, but may further search for another cell of an LTE standard. In this way, a range of cells that can be searched by the mobile terminal 100 can be expanded, thereby further improving efficiency of accessing the LTE network by the mobile terminal 100. In a specific example, if the threshold quantity of TAU failures in S210 are all for a same cell, the mobile terminal 100 may prohibit a search for the cell during the operation of the T3402 timer.

S230: After the duration of the T3402 timer, the mobile terminal 100 searches for an LTE network again, and initiates an attach (attach).

S230 is the same as S130 in Embodiment 1. For details, refer to related descriptions. Details are not described herein again.

In short, after the T3402 timer expires, the mobile terminal 100 may search for the LTE network again, that is, search for a 4G signal transmitted by a 4G base station. After the LTE network is found, an attach (attach) may be initiated to the corresponding network device 200. For a procedure in which the mobile terminal 100 initiates an attach (attach), refer to the procedure shown in FIG. 4. For example, the mobile terminal 100 may send an attach (attach) request to the network device 200 again.

It may be understood that, when the mobile terminal 100 moves quickly, locations at which the mobile terminal 100 performs S210 and S230 may change greatly. Therefore, network devices 200 interacting with the mobile terminal 100 when the mobile terminal 100 performs TAU in S210 and when the mobile terminal 100 is attached (attach) in S230 may be a same network device, or may be different network devices. In addition, when the mobile terminal 100 attempts to perform TAU for several times but fails in S210, there may be one or more network devices interacting with the mobile terminal 100. This is not limited in this embodiment of this application. In this embodiment of this application, a network device interacting with the mobile terminal 100 when the mobile terminal 100 performs TAU in S210 may be referred to as a second network device, and a network device interacting with the mobile terminal 100 when the mobile terminal 100 is attached (attach) in S230 may be referred to as a first network device.

When the mobile terminal 100 moves quickly, when performing S230, the mobile terminal 100 may have already entered a coverage area in which the LTE network is in a good condition. In this way, after S230 is performed, the mobile terminal 100 may receive an attach accept message (attach accept) sent by the network device 200, and may reply with an attach complete (accept complete) message to the network device 200. In this case, the mobile terminal 100 is successfully attached to, that is, successfully accesses the LTE network.

According to the technical solution provided in Embodiment 2, after a plurality of TAU failures, if the mobile terminal 100 moves to the coverage area in which the LTE network is in a good condition, the mobile terminal 100 may re-access the LTE network after the T3402 timer determined by the mobile terminal 100 expires, without waiting for the default duration, that is, 12 minutes. In other words, the mobile terminal 100 can quickly access the LTE network, thereby improving efficiency of accessing the LTE network and providing a user with good use experience of the mobile terminal.

The following briefly describes the reset and the increment of 1 of the TAU attempt counter.

The mobile terminal 100 may reset the TAU attempt counter to 0 in the following cases.

1. The attach (attach) succeeds.
2. The TAU succeeds.
3. The TAU fails, and a carried cause is #11, #12, #13, #14, #15, #25, or #35.
4. The mobile terminal 100 selects a new PLMN.
5. The mobile terminal 100 is in an EMM-REGISTERED.ATTEMPTING-TO-UPDATE state, and enters a new TA.
6. The mobile terminal 100 is in an EMM-REGISTERED.ATTEMPTING-TO-UPDATE state, and the T3402 is started.
7. The mobile terminal 100 is in an EMM-REGISTERED.ATTEMPTING-TO-UPDATE state, and the T3346 is started.

According to the following content in TS24.301 5.5.3:
[1] "Network failure": The UE shall stop timer T3430 if still running. The tracking area updating attempt counter shall be incremented, unless it was already set to 5.
[2] For the cases b, c, d, la k when the "Extended wait time" is ignored, and ka when the "Extended wait time CP data" is ignored, if the tracking area updating request is not for initiating a PDN connection for emergency bearer services, the tracking area updating attempt counter shall be incremented, unless it was already set to 5.

[3] Abnormal cases in the UE, SMS services not accepted: The UE shall stop timer T3430 if still running. The tracking area updating attempt counter shall be incremented, unless it was already set to 5.

[4] #17 (Network failure): The UE shall stop timer T3430 if still running, and shall enter state MM IDLE. The tracking area updating attempt counter shall be incremented, unless it was already set to 5.

[5] if the combined tracking area update was successful for EPS services only and the TRACKING AREA UPDATE ACCEPT message contained an EMM cause value not treated in subclause 5.5.3.3.4.3 or the EMM Cause IE is not included in the message, the UE shall proceed as follows: The UE shall stop timer T3430 if still running, and shall enter state MM IDLE. The tracking area updating attempt counter shall be incremented, unless it was already set to 5.

The mobile terminal 100 may increment 1 to the value of the TAU attempt counter in the following cases.

1. "Network failure": If the value of the TAU attempt counter is less than 5, the value of the TAU attempt counter is incremented by 1.

2. For the cases b, c, d, la, and k, if the TAU request is not for initiating a PDN connection for emergency cases, k when "extended wait time" is ignored and a ka bearer service when "extended wait time CP data" is ignored. If the value of the TAU attempt counter is less than 5, the value of the TAU attempt counter is incremented by 1.

Abnormal cases in the mobile terminal 100, SMS services not accepted: The mobile terminal 100 shall stop the T3410 if still running. If the value of the TAU attempt counter is less than 5, the value of the TAU attempt counter is incremented by 1.

3. #17 (Network failure): If the T3410 is still running, the mobile terminal 100 shall stop the T3410 and enter an MM IDLE state. If the value of the TAU attempt counter is less than 5, the value of the TAU attempt counter is incremented by 1.

4. If a combined connection is successful for an EPS service only and an attach accept (attach accept) message contains an EMM cause value not treated in clause 5.5.1.3.4.3 or an EMM cause IE is not included in the message, the mobile terminal 100 shall proceed as follows: If the T3410 is still running, the mobile terminal 100 shall stop the T3410 and enter an MM IDLE state. If the value of the TAU attempt counter is less than 5, the value of the TAU attempt counter is incremented by 1.

Figure 8A:
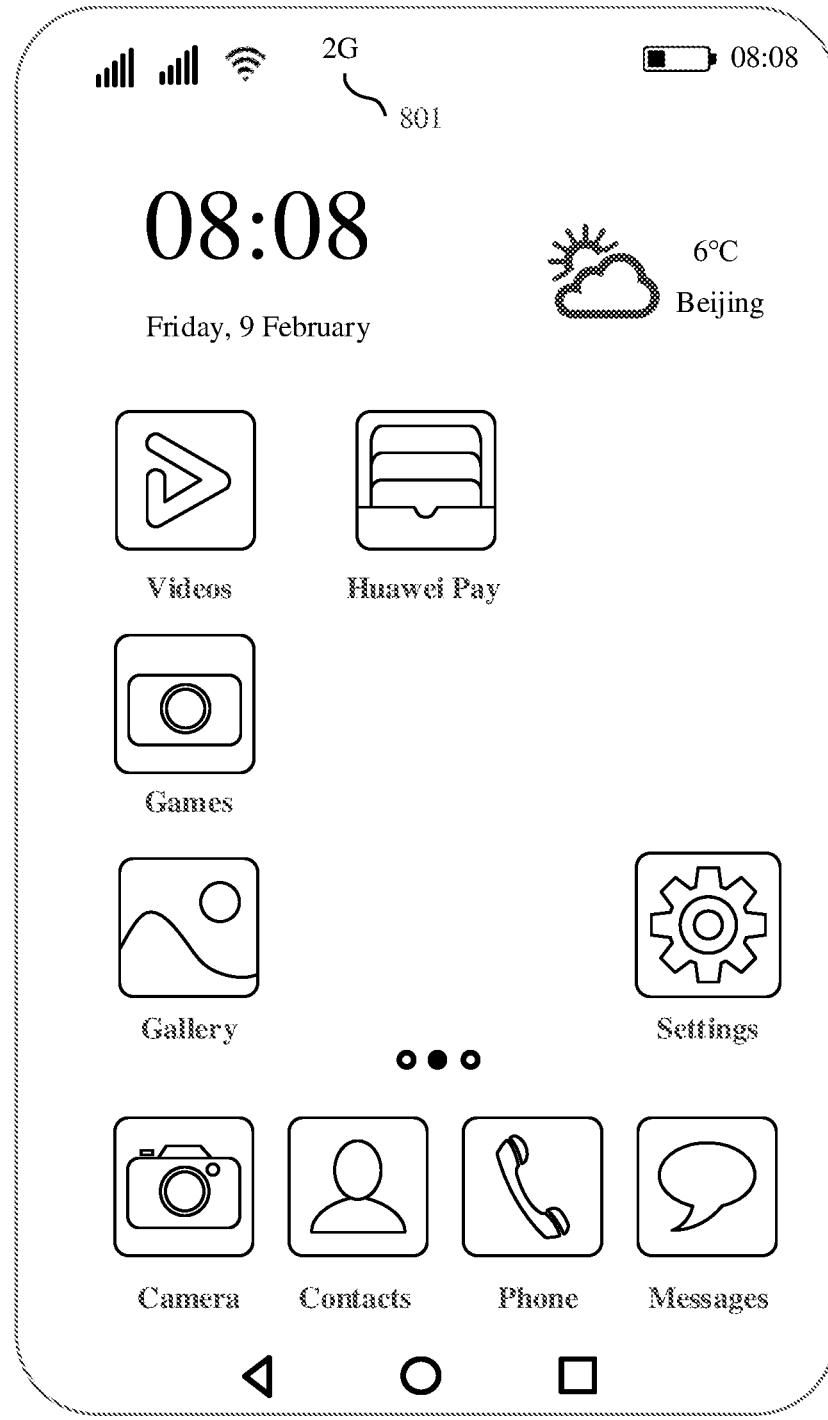
FIG. 8A and FIG. 8B show a set of user interfaces implemented on a mobile terminal according to an embodiment of this application.
Figure 8B:
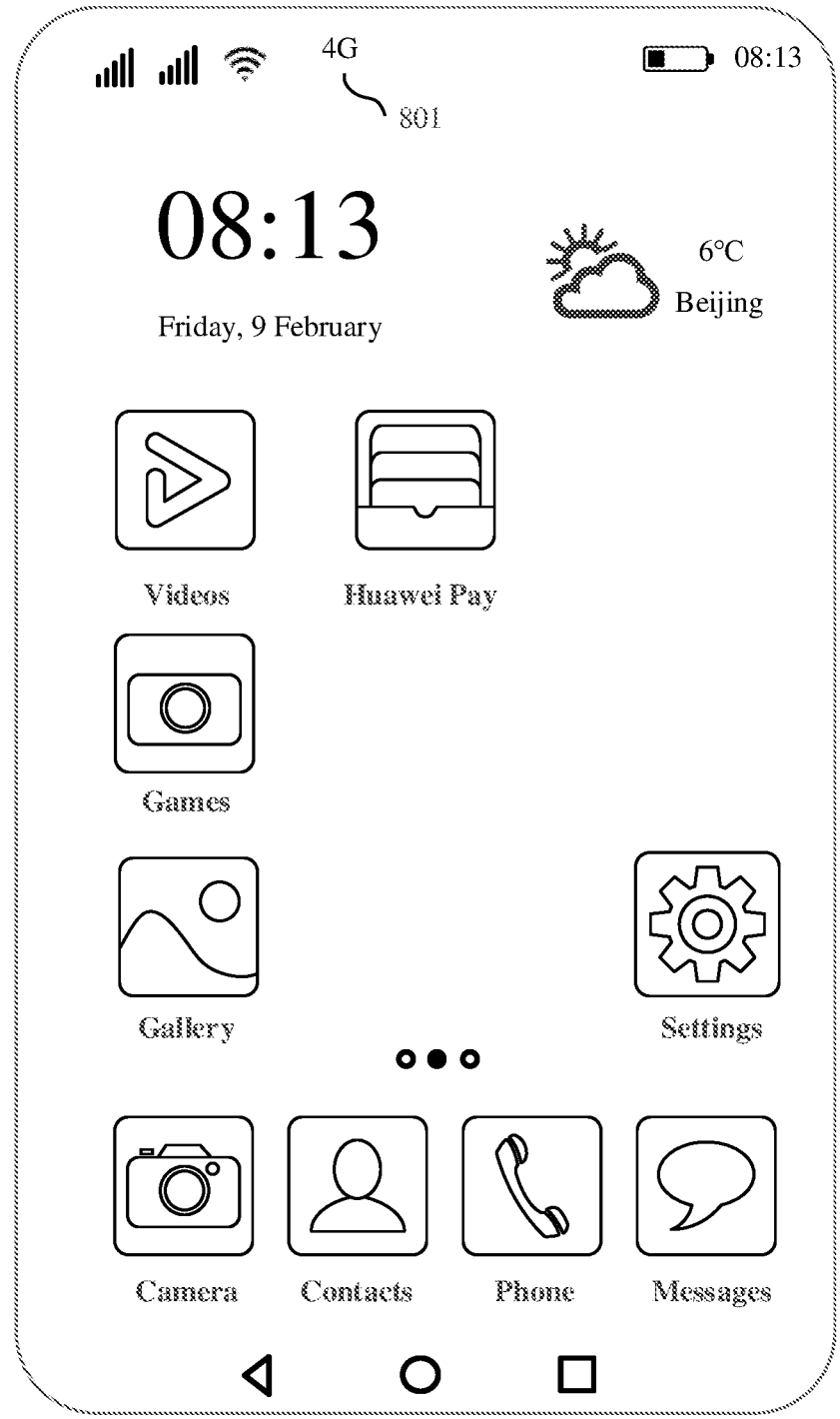

FIG. 8A and FIG. 8B show a set of user interfaces implemented on a mobile terminal 100 according to an embodiment of this application.

As shown in FIG. 8A and FIG. 8B, a status bar is displayed in the user interface of the mobile terminal 100. The status bar includes a network identifier, and the network identifier is used to indicate a network currently accessed by the mobile terminal. An implementation form of the network identifier may be a text, an icon, or the like. This is not limited in this embodiment of this application.

As shown in FIG. 8A, in a process in which the mobile terminal 100 continuously fails to access an LTE network and disables an E-UTRA capability, a network identifier 801 may be empty. In other words, the network identifier is not displayed. If the mobile terminal 100 falls back to a 2G/3G network or searches for a 5G network in a process of disabling the E-UTRA capability, the network identifier 801 may be displayed as a 2G/3G/5G network identifier, such as a text "2G", "3G", or "5G". For a scenario in which the mobile terminal 100 continuously fails to access the LTE network, refer to related descriptions in Embodiment 1 and Embodiment 2.

As shown in FIG. 8B, after the E-UTRA capability is enabled by the mobile terminal 100, if the mobile terminal 100 moves to a coverage area in which the LTE network is in a good condition and successfully accesses the LTE network, the network identifier 801 displayed in the user interface may be used to indicate the LTE network. For example, the network identifier may be a text "4G".

In this embodiment of this application, the user interfaces shown in FIG. 8A and FIG. 8B may be referred to as a first user interface, and an area used to display a network identifier in the user interface may be referred to as a first area.

The scenario in which the mobile terminal accesses the LTE network is not limited to the description in the foregoing embodiment. The technical solution described in this embodiment of this application may be further applied to a scenario in which the mobile terminal accesses a network of another standard. The network of another standard may include but is not limited to a 2G network, a 3G network, a new radio (new radio, NR) network, another future network, and the like. For example, when a quantity of attach failures or TAU failures in the NR reaches a threshold, the mobile terminal may start a timer, and disable an NR capability (disable the NR capability). The mobile terminal 100 attempts to access an NR network again after the timer expires. A value of the timer is determined by the mobile terminal 100 based on the moving speed of the mobile terminal 100. Herein, for a specific name of the timer, refer to a related protocol. This is not limited herein.

By implementing the technical solutions provided in embodiments of this application, the efficiency of accessing the network by the mobile terminal can be improved, and good use experience of the mobile terminal can be provided for the user.

Implementations of this application may be randomly combined to achieve different technical effects.

All or some of embodiments may be implemented through software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive)), or the like.

Persons of ordinary skill in the art may understand that all or some of the procedures of the methods in embodiments may be completed by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, improvement, and the like made according to the disclosure of the present invention shall fall within the protection scope of the present invention.

What is claimed is:

1. A method comprising:
    determining, by a mobile terminal, that a quantity of attach failures or tracking area update (TAU) failures of the mobile terminal in accessing a long term evolution (LTE) network reaches a threshold;
    starting, by the mobile terminal, a T3402 timer and disabling, by the mobile terminal, an evolved universal terrestrial radio access (E-UTRA) capability in response to the quantity of attach failures or TAU failures of the mobile terminal reaching the threshold, wherein duration of the T3402 timer is based on a moving speed of the mobile terminal, and when the moving speed reaches a first value, the duration of the T3402 timer is less than first default duration; and
    after the T3402 timer expires, searching for, by the mobile terminal, the LTE network again, and sending, by the mobile terminal, an attach request to a first network device of the LTE network.

2. The method according to claim 1, wherein
    when the moving speed is equal to the first value, the duration of the T3402 timer is equal to first duration; or
    when the moving speed is equal to a second value, the duration of the T3402 timer is equal to second duration, wherein
    the second value is greater than the first value, the second duration is less than the first duration, and both the first duration and the second duration are less than the first default duration.

3. The method according to claim 1, wherein
    when the moving speed is equal to the first value, the duration of the T3402 timer is equal to second default duration, and the second default duration is less than the first default duration.

4. The method according to claim 1, wherein when the moving speed is less than the first value, the duration of the T3402 timer is equal to the first default duration.

5. The method according to claim 1, further comprising:
    successively sending, by the mobile terminal, an attach request to a second network device of the LTE network for n times, wherein each time after the attach request is sent, no response message is received by the mobile terminal from the second network device, or an attach reject message sent by the second network device is received by the mobile terminal, and n is equal to the threshold.

6. The method according to claim 1, further comprising:
    successively sending, by the mobile terminal, a TAU request to a second network device of the LTE network for n times, wherein each time after the TAU request is sent, no response message is received from the second network device by the mobile terminal, or a TAU reject message sent by the second network device is received by the mobile terminal, and n is equal to the threshold.

7. The method according to claim 1, wherein after sending, by the mobile terminal, the attach request to the first network device, the method further comprises:
    receiving, by the mobile terminal, an attach accept message sent by the first network device.

8. The method according to claim 7, wherein the method further comprises:
    displaying, by the mobile terminal, a first user interface, wherein the first user interface comprises a first area, and wherein
    before the mobile terminal receives the attach accept message sent by the first network device, the first area displays no content, or the first area displays an identifier of a network currently accessed by the mobile terminal; and after the mobile terminal receives the attach accept message sent by the first network device, the first area displays an identifier of the LTE network.

9. The method according to claim 1, wherein before starting the T3402 timer and disabling the E-UTRA capability, the method further comprises:
    detecting, by the mobile terminal, the moving speed of the mobile terminal.

10. The method according to claim 1, wherein the first default duration is 12 minutes.

11. A mobile terminal, wherein the mobile terminal comprises a non-transitory memory and one or more processors; the memory is coupled to the one or more processors; the memory is configured to store computer program code; the computer program code comprises computer instructions; and the one or more processors are configured to invoke the computer instructions to cause the mobile terminal to perform:
    determining that a quantity of attach failures or tracking area update (TAU) failures of the mobile terminal reaches a threshold in accessing a long term evolution (LTE) network;
    starting a T3402 timer and disabling an E-UTRA capability in response to the quantity of attach failures or TAU failures of the mobile terminal reaching the threshold, wherein duration of the T3402 timer is based on a moving speed of the mobile terminal, and when the moving speed reaches a first value, the duration of the T3402 timer is less than first default duration; and
    after the T3402 timer expires, searching for the LTE network again, and sending an attach request to a first network device of the LTE network.

12. The mobile terminal according to claim 11, wherein
    when the moving speed is equal to the first value, the duration of the T3402 timer is equal to first duration; or
    when the moving speed is equal to a second value, the duration of the T3402 timer is equal to second duration, wherein
    the second value is greater than the first value, the second duration is less than the first duration, and both the first duration and the second duration are less than the first default duration.

13. The mobile terminal according to claim 11, wherein when the moving speed is equal to the first value, the duration of the T3402 timer is equal to second default duration, and the second default duration is less than the first default duration.

14. The mobile terminal according to claim 11, wherein when the moving speed is less than the first value, the duration of the T3402 timer is equal to the first default duration.

15. The mobile terminal according to claim 11, wherein the one or more processors are configured to invoke the computer instructions to cause the mobile terminal further to perform:
  successively sending an attach request to a second network device of the LTE network for n times, wherein each time after the attach request is sent, no response message is received from the second network device, or an attach reject message sent by the second network device is received, and n is equal to the threshold.

16. The mobile terminal according to claim 11, wherein the one or more processors are configured to invoke the computer instructions to cause the mobile terminal further to perform:
  successively sending a TAU request to a second network device of the LTE network for n times, wherein each time after the TAU request is sent, no response message is received from the second network device, or a TAU reject message sent by the second network device is received, and n is equal to the threshold.

17. The mobile terminal according to claim 11, wherein the one or more processors are further configured to invoke the computer instructions to cause the mobile terminal to perform:
  after sending the attach request to the first network device, receiving an attach accept message sent by the first network device.

18. The mobile terminal according to claim 17, wherein the one or more processors are further configured to invoke the computer instructions to cause the mobile terminal to perform:
  displaying a first user interface, wherein the first user interface comprises a first area, and wherein
  before the mobile terminal receives the attach accept message sent by the first network device, the first area displays no content, or the first area displays an identifier of a network currently accessed by the mobile terminal; and after the mobile terminal receives the attach accept message sent by the first network device, the first area displays an identifier of the LTE network.

19. The mobile terminal according to claim 11, wherein the one or more processors are further configured to invoke the computer instructions to cause the mobile terminal to perform:
  before starting the T3402 timer and disabling the E-UTRA capability, detecting the moving speed of the mobile terminal.

20. The mobile terminal according to claim 11, wherein the first default duration is 12 minutes.

* * * * *